United States Patent
Zielke et al.

(10) Patent No.: US 12,408,589 B2
(45) Date of Patent: *Sep. 9, 2025

(54) AGRICULTURAL SYSTEMS HAVING STALK SENSORS AND DATA VISUALIZATION SYSTEMS AND RELATED DEVICES AND METHODS

(71) Applicant: Ag Leader Technology, Ames, IA (US)

(72) Inventors: Roger Zielke, Huxley, IA (US); Scott Eichhorn, Ames, IA (US); Tony Woodcock, Ames, IA (US); Logan Handsaker, Ames, IA (US); Barry Anderson, Ames, IA (US)

(73) Assignee: Ag Leader Technology, Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/229,540

(22) Filed: Aug. 2, 2023

(65) Prior Publication Data
US 2024/0023482 A1    Jan. 25, 2024

Related U.S. Application Data

(63) Continuation of application No. 17/345,598, filed on Jun. 11, 2021, now Pat. No. 11,758,845, which is a
(Continued)

(51) Int. Cl.
*G08C 19/16* (2006.01)
*A01D 41/127* (2006.01)
(Continued)

(52) U.S. Cl.
CPC ......... *A01D 41/127* (2013.01); *A01D 45/023* (2013.01); *G01B 5/10* (2013.01); *H04Q 9/02* (2013.01); *H04Q 2209/84* (2013.01)

(58) Field of Classification Search
CPC .. A01D 41/127; A01D 45/023; A01D 45/021; G01B 5/10; G01B 5/025; H04Q 9/02; H04Q 2209/84; H04Q 9/00
(Continued)

(56) References Cited

U.S. PATENT DOCUMENTS

| | | |
|---|---|---|
| 2,419,061 A | 4/1947 | Emery |
| 2,813,709 A | 11/1957 | Hyman |

(Continued)

FOREIGN PATENT DOCUMENTS

| | | |
|---|---|---|
| AU | 2020201559 A1 | 4/2020 |
| BE | 1023764 B1 | 7/2017 |

(Continued)

OTHER PUBLICATIONS

Farm Show, "Easton Goers, Inc. Space Wheel Checks Seed Placement In Field—Space Cadet", 1996, Publisher: Farm Show.
(Continued)

*Primary Examiner* — Tai T Nguyen
(74) *Attorney, Agent, or Firm* — DENTONS DAVIS BROWN PC; Matthew Warner-Blankenship

(57) ABSTRACT

The disclosure relates to agricultural systems. The systems have stalk sensor assemblies and/or data visualization systems. The stalk sensor assemblies are configured for assessing the size and other characteristics about crops, such as corn and other grains entering an agricultural implement, such as a harvester. The stalk sensor assemblies may use an estimation of the stalk perimeter to establish stalk size and therefore further features about the crop. The visualization system utilizes data from the stalk sensor assemblies to calculate and display relevant information about the crop.

9 Claims, 26 Drawing Sheets

Related U.S. Application Data continuation of application No. 16/445,161, filed on Jun. 18, 2019, now Pat. No. 11,064,653.

(60) Provisional application No. 62/686,248, filed on Jun. 18, 2018, provisional application No. 62/810,231, filed on Feb. 25, 2019.

(51) Int. Cl.
*A01D 45/02* (2006.01)
*G01B 5/10* (2006.01)
*H04Q 9/02* (2006.01)

(58) Field of Classification Search
USPC ......................................................... 340/870
See application file for complete search history.

(56) References Cited

U.S. PATENT DOCUMENTS

| | | | |
|---|---|---|---|
| 3,038,544 A | 6/1962 | Richey et al. | |
| 3,178,873 A | 4/1965 | Meyer | |
| 3,246,701 A | 4/1966 | Horst | |
| 3,271,940 A | 9/1966 | Robert | |
| 3,616,690 A | 11/1971 | Harden | |
| 3,780,817 A | 12/1973 | Videon | |
| 3,853,000 A | 12/1974 | Barnett | |
| 3,972,381 A | 8/1976 | Gail | |
| 3,992,933 A | 11/1976 | Randolph | |
| 4,121,049 A | 10/1978 | Roeber | |
| 4,126,984 A | 11/1978 | Gail | |
| 4,166,349 A | 9/1979 | Coenenberg et al. | |
| 4,197,690 A | 4/1980 | Eistert | |
| 4,295,323 A | 10/1981 | Maier et al. | |
| 4,362,218 A | 12/1982 | Shoberg | |
| 4,418,521 A | 12/1983 | Orlando | |
| 4,423,640 A | 1/1984 | Jetter | |
| 4,505,094 A | 3/1985 | Demorest | |
| 4,528,804 A | 7/1985 | Williams | |
| 4,751,849 A | 6/1988 | Paros | |
| 4,883,964 A | 11/1989 | Bohman | |
| 4,896,491 A | 1/1990 | Warnsholz | |
| 4,918,441 A | 4/1990 | Bohman | |
| 4,967,362 A | 10/1990 | Schutten et al. | |
| 5,044,210 A | 9/1991 | Kuhn et al. | |
| 5,216,795 A | 6/1993 | Hansson | |
| 5,264,709 A | 11/1993 | Kamimura | |
| 5,343,761 A | 9/1994 | Myers | |
| 5,369,603 A | 11/1994 | Myers | |
| 5,463,854 A | 11/1995 | Chmielewski, Jr. | |
| 5,480,354 A | 1/1996 | Sadjadi | |
| 5,568,405 A | 10/1996 | Easton et al. | |
| 5,598,794 A | 2/1997 | Harms et al. | |
| 5,680,750 A | 10/1997 | Stefl | |
| 5,751,576 A * | 5/1998 | Monson | A01B 79/005 239/161 |
| 5,790,428 A | 8/1998 | Easton et al. | |
| 5,847,290 A | 12/1998 | Kim | |
| 5,878,561 A | 3/1999 | Gunn | |
| 5,921,070 A | 7/1999 | Chamberlain | |
| 5,927,054 A | 7/1999 | Chamberlain | |
| 5,991,694 A | 11/1999 | Gudat et al. | |
| 6,041,583 A | 3/2000 | Goering | |
| 6,073,427 A * | 6/2000 | Nichols | A01D 41/1271 460/7 |
| 6,085,846 A | 7/2000 | Buchl et al. | |
| 6,119,442 A | 9/2000 | Hale | |
| 6,202,395 B1 | 3/2001 | Gramm | |
| 6,216,795 B1 | 4/2001 | Buchl | |
| 6,272,819 B1 | 8/2001 | Wendte | |
| 6,431,981 B1 | 8/2002 | Shinners | |
| 6,530,197 B1 | 3/2003 | Christensen | |
| 6,584,390 B2 | 6/2003 | Beck | |
| 6,615,570 B2 | 9/2003 | Beck | |
| 6,668,223 B2 | 12/2003 | Blackmore et al. | |
| 6,774,320 B2 | 8/2004 | Simons | |
| 6,983,582 B1 | 1/2006 | Muckler | |
| 6,986,582 B2 | 1/2006 | Muckler | |
| 7,354,341 B1 | 4/2008 | Smith | |
| 7,357,036 B2 | 4/2008 | Steprath | |
| 7,401,506 B2 | 7/2008 | Kunow | |
| 7,401,528 B2 | 7/2008 | Deppermann et al. | |
| 7,647,753 B2 | 1/2010 | Schlipf | |
| 7,716,905 B2 | 5/2010 | Wilcox et al. | |
| 7,739,861 B2 | 6/2010 | Mackin | |
| 7,790,991 B2 | 9/2010 | Verhaeghe | |
| 7,916,898 B2 | 3/2011 | Anderson | |
| 8,006,472 B1 | 8/2011 | Schreiner | |
| 8,010,261 B2 | 8/2011 | Brubaker | |
| 8,196,380 B2 | 6/2012 | Carboni | |
| 8,201,388 B1 | 6/2012 | Vandeven | |
| 8,215,191 B2 | 7/2012 | Tragesser et al. | |
| 8,220,235 B2 | 7/2012 | Kowalchuk | |
| 8,224,534 B2 | 7/2012 | Kowalchuk | |
| 8,418,636 B2 | 4/2013 | Liu et al. | |
| 8,820,039 B2 | 9/2014 | Werning | |
| 8,987,615 B2 | 3/2015 | Khatavkar | |
| 9,030,549 B2 | 5/2015 | Redden | |
| 9,064,173 B2 | 6/2015 | Redden | |
| 9,066,463 B2 | 6/2015 | Lange | |
| 9,213,905 B2 | 12/2015 | Lange | |
| 9,232,693 B2 | 1/2016 | Hendrickson et al. | |
| 9,282,693 B2 | 3/2016 | Anderson | |
| 9,310,329 B2 | 4/2016 | Acheson et al. | |
| 9,320,196 B2 | 4/2016 | Dybro et al. | |
| 9,322,629 B2 | 4/2016 | Sauder et al. | |
| 9,360,383 B2 | 6/2016 | Coleman | |
| 9,372,109 B2 | 6/2016 | Acheson et al. | |
| 9,410,840 B2 | 8/2016 | Acheson et al. | |
| 9,423,249 B2 | 8/2016 | Deppermann et al. | |
| 9,485,914 B2 | 11/2016 | Schleicher et al. | |
| 9,565,802 B2 | 2/2017 | Schleicher | |
| 9,578,804 B2 | 2/2017 | Gessel | |
| 9,578,808 B2 | 2/2017 | Dybro | |
| 9,609,806 B2 | 4/2017 | Schlipf | |
| 9,645,006 B2 | 5/2017 | Phelan | |
| 9,658,201 B2 | 5/2017 | Redden et al. | |
| 9,668,412 B2 | 6/2017 | Ritter | |
| 9,668,420 B2 | 6/2017 | Anderson | |
| 9,693,496 B2 | 7/2017 | Tevs et al. | |
| 9,693,503 B2 | 7/2017 | Dybro et al. | |
| 9,696,162 B2 | 7/2017 | Anderson | |
| 9,717,171 B2 | 8/2017 | Redden et al. | |
| 9,756,771 B2 | 9/2017 | Redden | |
| 9,804,097 B1 | 10/2017 | Tang et al. | |
| 9,826,673 B1 | 11/2017 | Ray | |
| 9,832,928 B2 | 12/2017 | Dybro et al. | |
| 9,867,334 B2 | 1/2018 | Jongmans et al. | |
| 9,867,335 B1 | 1/2018 | Obbink et al. | |
| 9,894,835 B2 | 2/2018 | Sauder et al. | |
| 9,921,064 B2 | 3/2018 | Schleicher | |
| 9,927,242 B2 | 3/2018 | Schleicher | |
| 9,936,631 B1 | 4/2018 | Hubner et al. | |
| 9,936,637 B2 | 4/2018 | Anderson et al. | |
| 9,972,058 B2 | 5/2018 | Romier | |
| 9,974,233 B2 | 5/2018 | Ueda et al. | |
| 10,034,424 B2 | 7/2018 | Anderson | |
| 10,039,228 B2 * | 8/2018 | Walker | A01D 63/00 |
| 10,039,231 B2 * | 8/2018 | Anderson | G01B 21/08 |
| 10,130,035 B2 * | 11/2018 | Crow | A01D 45/023 |
| 10,178,828 B2 | 1/2019 | Hendrickson et al. | |
| 10,188,037 B2 | 1/2019 | Sauder | |
| 10,255,670 B1 | 4/2019 | Wu | |
| 10,295,703 B2 | 5/2019 | Dybro | |
| 10,299,422 B2 | 5/2019 | Schleicher | |
| 10,473,592 B2 | 11/2019 | Kramer et al. | |
| 10,537,060 B2 | 1/2020 | Sauder et al. | |
| 10,582,662 B2 * | 3/2020 | Ricketts | A01D 45/021 |
| 10,713,768 B2 | 7/2020 | Berghoefer | |
| 10,820,508 B2 | 11/2020 | Dix et al. | |
| 10,859,479 B2 | 12/2020 | Brune et al. | |
| 11,048,938 B2 | 6/2021 | Hundley et al. | |
| 11,064,653 B2 | 7/2021 | Zielke | |
| 11,079,725 B2 | 8/2021 | Palla | |

(56) References Cited

U.S. PATENT DOCUMENTS

| | | |
|---|---|---|
| 11,129,333 B2 | 9/2021 | Derscheid |
| 11,234,366 B2 | 2/2022 | Darr |
| 11,275,941 B2 | 3/2022 | Papanikolopoulos et al. |
| 11,297,768 B2 | 4/2022 | Schildroth |
| 11,432,464 B2 | 9/2022 | Hayashi |
| 11,678,607 B2 | 6/2023 | Zielke |
| 11,704,810 B2 | 7/2023 | Sneyders |
| 11,758,845 B2 | 9/2023 | Zielke |
| 11,758,848 B2 | 9/2023 | Eichhorn |
| 2002/0173893 A1 | 11/2002 | Blackmore et al. |
| 2004/0050138 A1 | 3/2004 | Beck |
| 2004/0194442 A1 | 10/2004 | Maertens |
| 2007/0044445 A1 | 3/2007 | Spicer et al. |
| 2007/0228707 A1 | 10/2007 | Curtis |
| 2007/0289281 A1 | 12/2007 | Altepost |
| 2008/0046154 A1 | 2/2008 | Bares |
| 2009/0192734 A1 | 7/2009 | Mackin |
| 2010/0089178 A1* | 4/2010 | Tragesser ............ A01D 43/085 73/862.627 |
| 2011/0173942 A1 | 7/2011 | Kowalchuk |
| 2012/0029757 A1 | 2/2012 | Kowalchuk |
| 2012/0042618 A1 | 2/2012 | Lohrentz |
| 2012/0042619 A1 | 2/2012 | Lohrentz et al. |
| 2012/0055131 A1 | 3/2012 | Zegota |
| 2012/0055133 A1 | 3/2012 | Lohrentz |
| 2012/0204528 A1 | 8/2012 | Regier |
| 2012/0253611 A1 | 10/2012 | Zielke |
| 2013/0125800 A1 | 5/2013 | Andphair et al. |
| 2013/0152535 A1 | 6/2013 | Roberge |
| 2014/0020354 A1 | 1/2014 | Tilly |
| 2014/0116077 A1 | 5/2014 | Pierce |
| 2014/0230391 A1 | 8/2014 | Hendrickson |
| 2014/0230580 A1 | 8/2014 | Dybro |
| 2014/0236381 A1 | 8/2014 | Anderson |
| 2014/0311113 A1 | 10/2014 | Bonefas |
| 2014/0331631 A1 | 11/2014 | Sauder |
| 2015/0082760 A1* | 3/2015 | Zentner ............... A01D 45/021 56/62 |
| 2015/0082780 A1 | 3/2015 | Dueckinghaus |
| 2015/0257337 A1 | 9/2015 | Schrattenecker |
| 2015/0289438 A1 | 10/2015 | Sauder et al. |
| 2015/0293029 A1 | 10/2015 | Acheson |
| 2015/0293068 A1 | 10/2015 | Acheson et al. |
| 2015/0302305 A1* | 10/2015 | Rupp .................... G06N 7/06 706/46 |
| 2015/0319929 A1* | 11/2015 | Hendrickson ........ A01D 75/00 33/504 |
| 2015/0327440 A1 | 11/2015 | Dybro |
| 2015/0334920 A1 | 11/2015 | Schleicher |
| 2016/0037709 A1 | 2/2016 | Sauder et al. |
| 2016/0041803 A1 | 2/2016 | Markov |
| 2016/0084813 A1 | 3/2016 | Anderson |
| 2016/0084987 A1 | 3/2016 | Dybro |
| 2016/0120129 A1 | 5/2016 | Verhaeghe |
| 2016/0174465 A1 | 6/2016 | Kohls |
| 2016/0338267 A1 | 11/2016 | Anderson et al. |
| 2016/0345485 A1 | 12/2016 | Acheson |
| 2017/0061211 A1 | 3/2017 | Hundley et al. |
| 2017/0089742 A1 | 3/2017 | Bruns |
| 2017/0199528 A1* | 7/2017 | Detweiler .............. B64U 10/13 |
| 2017/0228118 A1 | 8/2017 | Sugumarn et al. |
| 2017/0251600 A1 | 9/2017 | Anderson |
| 2017/0332551 A1 | 11/2017 | Todd |
| 2017/0339827 A1 | 11/2017 | Anderson |
| 2018/0017965 A1 | 1/2018 | Kosa |
| 2018/0084725 A1 | 3/2018 | Ostermeier |
| 2018/0092303 A1 | 4/2018 | Goering |
| 2018/0164471 A1 | 6/2018 | Dybro |
| 2018/0199509 A1 | 7/2018 | Ricketts |
| 2018/0228086 A1 | 8/2018 | Cook |
| 2018/0338423 A1 | 11/2018 | Lucca |
| 2018/0368321 A1 | 12/2018 | Noonan |
| 2018/0373259 A1 | 12/2018 | Aberle |
| 2019/0000007 A1 | 1/2019 | Schleicher |
| 2019/0059223 A1 | 2/2019 | Seiders |
| 2019/0110394 A1 | 4/2019 | VanNahmen |
| 2019/0174667 A1 | 6/2019 | Gresch |
| 2019/0195762 A1 | 6/2019 | Brune |
| 2019/0261561 A1 | 8/2019 | Heitmann |
| 2020/0000034 A1 | 1/2020 | Schlipf |
| 2020/0008351 A1 | 1/2020 | Zielke |
| 2020/0053961 A1 | 2/2020 | Dix |
| 2020/0068803 A1 | 3/2020 | Sauder et al. |
| 2020/0326674 A1 | 10/2020 | Palla |
| 2020/0394580 A1 | 12/2020 | Bull |
| 2021/0051849 A1 | 2/2021 | Asebedo |
| 2021/0059114 A1 | 3/2021 | Eichhorn |
| 2021/0132618 A1 | 5/2021 | Van Roekel |
| 2021/0168991 A1 | 6/2021 | Dix |
| 2021/0195824 A1 | 7/2021 | Van Roekel |
| 2021/0315160 A1 | 10/2021 | Zielke |
| 2021/0318118 A1 | 10/2021 | Eichhorn |
| 2021/0321567 A1 | 10/2021 | Sidon |
| 2021/0329837 A1 | 10/2021 | Schnaider |
| 2021/0329838 A1 | 10/2021 | Zielke |
| 2021/0352847 A1 | 11/2021 | Hunt |
| 2022/0000024 A1 | 1/2022 | Zielke |
| 2022/0071093 A1 | 3/2022 | Risius |
| 2022/0078975 A1 | 3/2022 | Slichter |
| 2022/0132737 A1 | 5/2022 | Anderson |
| 2022/0225569 A1 | 7/2022 | Zielke |
| 2022/0232759 A1 | 7/2022 | Sauder |
| 2022/0317688 A1 | 10/2022 | Li |
| 2022/0386527 A1 | 12/2022 | Schleicher |
| 2023/0000015 A1 | 1/2023 | Herrmann |
| 2023/0073551 A1 | 3/2023 | Holoubek |
| 2023/0139169 A1 | 5/2023 | Cleodolphi |
| 2023/0189690 A1 | 6/2023 | Friedlein |
| 2023/0229163 A1 | 7/2023 | Rust |
| 2023/0240185 A1 | 8/2023 | Zielke |
| 2023/0243693 A1 | 8/2023 | McClelland |
| 2023/0292664 A1 | 9/2023 | Zielke |
| 2023/0389473 A1 | 12/2023 | Reed |
| 2023/0401703 A1 | 12/2023 | Friedlein |
| 2024/0023482 A1 | 1/2024 | Zielke |
| 2024/0065156 A1 | 2/2024 | Woodcock |
| 2024/0081171 A1 | 3/2024 | Schwartz |
| 2024/0090379 A1 | 3/2024 | Eichhorn |
| 2024/0373785 A1 | 11/2024 | Risius |
| 2024/0389494 A1 | 11/2024 | Vorobiev |
| 2025/0185540 A1 | 6/2025 | Eichhorn |
| 2025/0194459 A1 | 6/2025 | Roe |

FOREIGN PATENT DOCUMENTS

| | | |
|---|---|---|
| BR | 102017018379 A2 | 5/2018 |
| CA | 2313376 | 7/2000 |
| DE | 1928065 A1 | 5/1970 |
| DE | 112014000906 T5 | 11/2015 |
| EP | 2191439 B1 | 2/2009 |
| EP | 2047738 A2 | 4/2009 |
| EP | 3146831 B1 | 3/2017 |
| EP | 2944179 B1 | 11/2017 |
| EP | 3245859 A1 | 4/2019 |
| EP | 3095313 B1 | 5/2019 |
| EP | 3972381 A1 | 3/2022 |
| JP | 6216795 B2 | 10/2017 |
| WO | 2013078328 A2 | 5/2013 |

OTHER PUBLICATIONS

D. Easton, "Corn Population and Plant Spacing Variability: The Next Mapping Layer", 1996, pp. 723-727, Publisher: ASA-CSSA-SSSA, Published in: Madison, WI.

Hummel et al., "Sensing Corn Population—Another Variable in the Yield Equation", available as early as 2016.

Gore, L. M. 1996. Report: Stalk counter for VRT study fall of 1995. Deere & Co. Moline, IL, available as early as 2016.

Baweja, Harjatin & Parhar, Tanvir & Mirbod, Omeed & Nuske, Stephen. (2018). StalkNet: A Deep Learning Pipeline for ligh-Throughput Measurement of Plant Stalk Count and Stalk Width.

Birrell et al., "Corn Population Sensor for Precision Farming",

(56) References Cited

OTHER PUBLICATIONS

"American Society of Agricultural Engineers. Annual Meeting", 1995, vol. 95, No. 1334, Publisher: ASAE.

Jonathan P. Kelly, "By-Plant Prediction of Corn (*Zea mays* L.) Grain Yield Using Height and Stalk Diameter", 2009, Publisher: Faculty of the Graduate College of the Oklahoma State University.

Haizhou Li, "Design and Evaluation of a Non-Intrusive Corn Population Sensor", "Trace: Tennessee Research and Creative Exchange, Doctoral Dissertations, Graduate School", Aug. 2007, Publisher: University of Tennessee, Knoxville.

Luck et al., "Sensor Ranging Technique for Determining Corn Plant Population", "Faculty Papers and Publications In Animal Science—Animal Science Department", 2008, vol. 920, Publisher: University of Nebraska—Lincoln.

Plattner, C. E., J. W. Hummel 1996. Corn Plant Population Sensor for Precision Agriculture. In: P.C. Robert, R.H. Rust, W.E. Larson, editors, Precision Agriculture, ASA, CSSA, SSSA, Madison, WI. p. 785-794.

Yeyin Shi, "Corn Plant Location, Spacing and Stalk Diameter Measurements Using Optical Sensing Technologies", May 2014, Publisher: Faculty of the Graduate College of the Oklahoma State University.

Shrestha et al., "Automatic Corn Plant Population Measurement Using Machine Vision", "Transactions of the ASAE", 2003, pp. 559-565, vol. 46(2), Publisher: American Society of Agricultural Engineers.

Sudduth, K.A., Birrell, S.J., Krumpelman, M.J., Robert, P., Rust, R.H., & Larson, W.E. (2000). Field evaluation of a corn population sensor.

Sudduth et al., "Field Evaluation of a Corn Population Sensor", available as early as 2016.

Drago, Row by Row 2020 Special Report Harvest Study Reveals Most Corn Heads Leaving Yield in the Field.

Headsight, Inc., "Row Guidance for Corn", Jan. 2021, https://headsight.com/row-guidance-corn.

John Deere SSA, "AutoTrac RowSense | Precision AG | John Deere SSA", Jan. 2021, https://www.deere.com/sub-saharan/en/technology-products/precision-ag/autotrac-rowsense/.

Reichhardt Electronic Innovations, "PSR Sensor Guidance", Jan. 2021, www.reichhardt.com/us_products_autosteer-system_autoguidance-tac.html.

Yu, H. Zheng, S. R. Kulkarni, H. V. Poor, "Outlier elimination for robust ellipse and ellipsoid fitting," in Proc. 3rd IEEE Int. Workshop Comput. Adv. Multi-Sensor Adapt. Process. (CAMSAP), Aruba, Dutch Antilles, Dec. 2009, pp. 33-36.

Contributions to Wikimedia projects (2020, Feb. 20), Numerical integration. Wikipedia. Https://web.archive.org/web/20200325094046/https://en.wikipedia.org/wiki/numerical_integration (Year: 2020).

Area of a circle (Mar. 10, 2020). Wikipedia. Https://web.archive.org/web/20200325064526/https://en.wikipedia.org/wiki/Area_of_acircle (year 2020).

Miller et al (Nov. 16, 2016). The Plant Journal. https://onlinelibrary.wiley.com/doi/pdf/10.1111/tpj.13320.

Of GIS Ag Maps (here in as GIS), "Yield Monitor Data Post-Calibration (Linear and Non-Linear) Examples", Jan. 20, 2022, 8 pages + 1 SS page (9 pgs total).

\* cited by examiner

| Corn Hybrid | YPA (bu/ac) | Planted (plts/ac) | Harvested (plts/ac) | % missing plants | YPK (bu per 1000 plts) | Potential lost yield (bu/ac) | Economic Loss/ac |
|---|---|---|---|---|---|---|---|
| DK 62-08 | 223 | 29,840 | 29,160 | 2.3% | 7.6 | 5 | $18 |
| DK 63-33 | 223 | 29,730 | 29,160 | 1.9% | 7.6 | 4 | $14 |
| P 0987AMX | 210 | 30,030 | 27,280 | 9.2% | 7.7 | 21 | $74 |

| Corn Hybrid | YPA (bu/ac) | Planted (plts/ac) | Harvested (plts/ac) | % missing plants | % emerged late plants | YPK (bu per 1000 plts) | Potential lost yield (bu/ac) | Economic Loss/ac |
|---|---|---|---|---|---|---|---|---|
| 61-49 | 173 | 34,300 | 29,155 | 12.0% | 3% | 5.9 | 30 | $105 |
| 42-98 | 173 | 34,300 | 24,353 | 25.0% | 4% | 7.1 | 71 | $249 |

AGRICULTURAL SYSTEMS HAVING STALK SENSORS AND DATA VISUALIZATION SYSTEMS AND RELATED DEVICES AND METHODS

CROSS-REFERENCE TO RELATED APPLICATION(S)

This application is a continuation of U.S. application Ser. No. 17/345,598, filed Jun. 11, 2021, now U.S. Pat. No. 11,758,845, which is a continuation of U.S. application Ser. No. 16/445,161, filed Jun. 18, 2019, now U.S. Pat. No. 11,064,653, that claims the benefit under 35 U.S.C. § 119(e) to U.S. Provisional Application 62/686,248, filed Jun. 18, 2018, and entitled "Corn Head Stalk Sensor" and U.S. Provisional Application 62/810,231, filed Feb. 25, 2019, and entitled "Corn Head Stalk Sensor Data Visualization," both of which are hereby incorporated herein by reference in their entirety for all purposes.

TECHNICAL FIELD

This disclosure relates generally to agricultural implements, more particularly agricultural implements and sensors for detecting, measuring and displaying information about plant stalks during harvest.

BACKGROUND

Generating accurate yield maps is an important tool in agriculture because it can assist stakeholders in making decisions and assessing prior actions. Prior yield maps analyze yields but do not detect missing plants or late emerged plants. Accurate knowledge of missing or late emerged plants may be useful to a practitioner in assessing the best course of action to improve future yields.

There is a need in the art for devices, systems and methods for counting, measuring, and displaying data related to plant yield on a row-by-row basis during harvest.

BRIEF SUMMARY

Disclosed herein are various harvesters, more specifically corn heads and associated sensors and data visualization systems on combine harvesters. Various sensors mounted on a corn head may count and measure corn stalks as they pass through the corn head during harvest. Processing components and display units are used to calculate and display information about the measured stalks to provide the user with information about yield including on a row-by-row and plant-by-plant level.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One Example includes an agricultural system, including at least one stalk sensor assembly, where the at least one stalk sensor assembly is constructed and arranged to measure stalk size. Other embodiments of this Example include corresponding computer systems, apparatus, and computer programs recorded on one or more computer storage devices, each configured to perform the actions of the methods.

Implementations according to this Example may include one or more of the following features. The agricultural system where the at least one stalk sensor assembly includes one or more wheels. The agricultural system where: the one or more wheels engage with stalks so as to rotate, and the agricultural system estimates the size of the stalks via the wheel rotation. The agricultural system where the one or more wheels is operationally coupled to one or more pulse sensors. The agricultural system where the one or more wheels is operationally coupled to one or more brakes. The agricultural system where the one or more wheels is operationally coupled to one or more proximity sensors. The agricultural system further including a visualization system. The agricultural system where the visualization system includes a user interface on an in-cab display. Implementations of the described techniques may include hardware, a method or process, or computer software on a computer-accessible medium.

One general Example includes an agricultural system, including at least one stalk sensor assembly including: at least one wheel; at least one resilient member operatively engaged with the at least one wheel, at least one pulse sensor in communication with the wheel and constructed and arranged to detect degrees of rotation of the at least one wheel, where the degrees of rotation of the at least one wheel are correlated to stalk size. Other embodiments of this Example include corresponding computer systems, apparatus, and computer programs recorded on one or more computer storage devices, each configured to perform the actions of the methods.

Implementations according to this Example may include one or more of the following features. The agricultural system further including a visualization system in communication with the at least one sensor assembly. The agricultural system where the visualization system includes a yield monitor. The agricultural system where the yield monitor is constructed and arranged to determine yield on a row-by-row basis. The agricultural system where the visualization system is constructed and arranged to calculate and display one or more of harvested plants, late emergence, missing plants, yield per plant, yield per area, yield per thousand, bushels per acre, bushels per thousand, economic loss, row-by-row area counting, and row plugs. The agricultural system further including a late emerged threshold defined by wheel rotation. Implementations of the described techniques may include hardware, a method or process, or computer software on a computer-accessible medium.

One Example includes an agricultural system, including: a sensor assembly including: a first wheel and a second wheel, a first pulse sensor in communication with the first wheel, and a second pulse sensor in communication with the second wheel, where the first pulse sensor and the second pulse sensor measure degrees of rotation of the first wheel and the second wheel. Other embodiments of this Example include corresponding computer systems, apparatus, and computer programs recorded on one or more computer storage devices, each configured to perform the actions of the methods.

Implementations according to this Example may include one or more of the following features. The agricultural system where the sensor assembly is constructed and arranged to estimate a stalk circumference from the degrees of rotation. The agricultural system further including a first resilient member operatively engaged with the first wheel and a second resilient member operatively engaged with the second wheel. The agricultural system further including a visualization system. The agricultural system further including at least one proximity sensor. The agricultural system further including a row unit plug alarm. Implementations of the described techniques may include hardware, a method or process, or computer software on a computer-accessible medium.

While multiple embodiments are disclosed, still other embodiments of the agricultural system will become apparent to those skilled in the art from the following detailed description, which shows and describes illustrative embodiments of the system and associated devices and methods of use. As will be realized, these systems, methods and devices are capable of modifications in various obvious aspects, all without departing from the spirit and scope of the disclosure. Accordingly, the drawings and detailed description are to be regarded as illustrative in nature and not restrictive.

DETAILED DESCRIPTION

Various implementations of the disclosed systems, devices and methods relate to agricultural yield and monitoring systems having at least one of a data visualization system and any associated sensor assemblies. In some implementations, a harvester has a corn head comprising a plurality of row units. Each row unit or some of the row units have an operatively engaged stalk sensor assembly for counting and measuring plant stalks. The sensor assemblies are in communication with the data visualization system and associated computer(s) and/or other processing mechanisms to calculate and display various data including yield per acre, number of plants planted per acre, the number of plants harvested per acre, the percentage of missing plants, the percentage of emerged late plants, the yield per 1000 plants, the potential lost yield, economic loss per acre, and various other parameters as are herein disclosed and as would be recognized by those of skill in the art.

In various of these and other implementations, the sensor assemblies are rotational stalk sensor assemblies. These sensor assemblies mechanically engage plant stalks to detect and measure the plant stalks on an individual plant and row-by-row basis.

Figure 1:
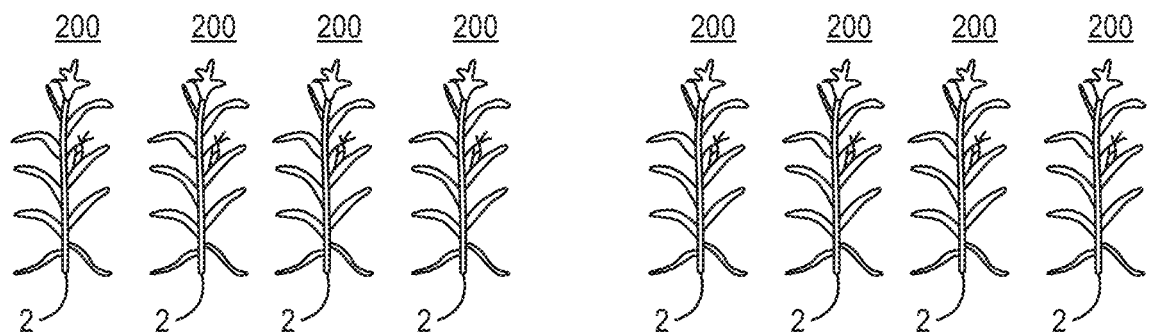
FIG. 1 is a side view of a row of corn plants.
Figure 2:
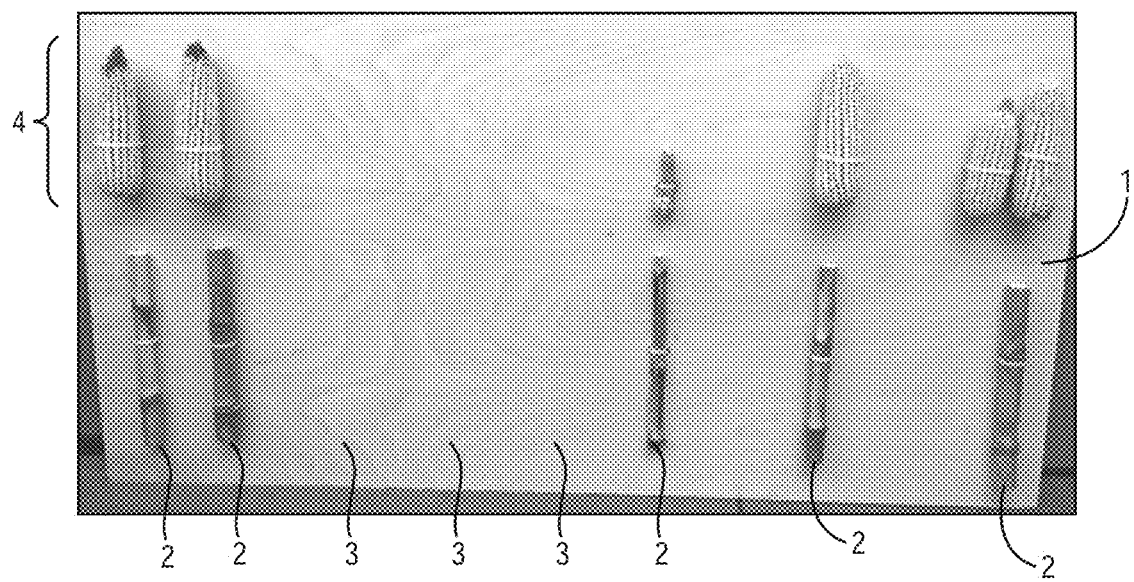
FIG. 2 shows ears of corn from a row having missing plants.

Turning to the drawings in greater detail, FIG. 1 depicts a row 1 of corn plants 2 having a missing plant (shown at 3 in FIG. 2). In an illustrative example, each plant 2 has a per plant yield equivalent to 200 bushels per acre (bu/ac). Plants 2 on each side of the missing plant 3 also have a projected per plant yield equivalent to about 200 bu/ac, illustrating no yield compensation for any missing plants 3. In some instances, plants 2 on either side of the missing plant 3 may marginally compensate for the missing plant 3 by growing a slightly larger ear. It is understood that any corresponding yield regain—by adjacent plants 2—is small or negligible. Most consider any yield compensation to be financially insignificant or negligible.

On a prior art yield map, such as that known in the art, missing corn plants 3 are interpreted or depicted as merely a lower yield for an entire field area. That is, areas with missing plants 3 can appear the same on a yield map as areas without missing plants 3 but as having smaller ears or lower yield.

Figure 3:
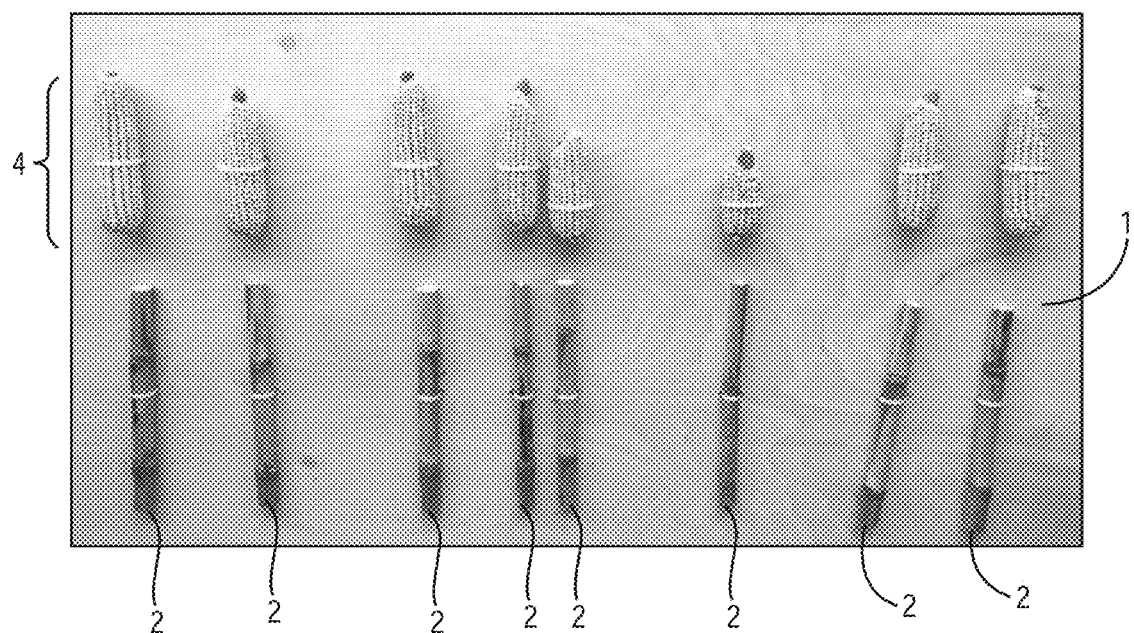
FIG. 3 show ears of corn from a row without missing plants.

FIGS. 2-3 show ears 4 taken from two different four-foot row strips in the same field. Three to four plants are missing in FIG. 2, while all plants are present in FIG. 3. One of skill would appreciate that the ears are smaller in FIG. 3 than the ears in FIG. 2. Consequently, both strips have the same yield quantity despite the greater number of ears in FIG. 3. These two strips would be indistinguishable on a yield map because their yield quantities are interpreted as the same, because there is not an accurate count of the missing plants 3.

It will be further appreciated by those of skill in the art from FIG. 2-3 that knowledge of missing plants 3 is required to correctly troubleshoot low yielding areas on a yield map. That is because actions to correct missing corn plants 3—no ears/no plant—are different from actions to correct low yields of a "full stand" row where all plants 2 are present but the ears are smaller.

It is further understood that missing corn plants 3 are often caused by issues at planting that prevent or delay plant emergence. For example, mechanical planter problems like skips in planted seeds, improper seed depth, improper seed trench closure and crop residue that blocks plant emergence are various issues that may prevent plant emergence and lead to missing plants 3. Further, agronomic factors at planting such as unviable seeds, cold soil temperatures, dry soil and soil diseases can also halt plant emergence and lead to missing plants 3.

By contrast, low yields from a full stand of corn are frequently caused by in season growing problems such as water shortage, fertilizer shortage, excessive heat during pollination, disease stress and other factors recognized by a person of ordinary skill in the art.

Missing plants 3 commonly account for significant economic yield loss, sometimes as high as 10%. Additionally, the magnitude of missing plants 3 can vary substantially across fields. For example, the number of missing plants 3 can vary by soil type, slope as well as by different agronomic and tillage treatments.

Figure 4:
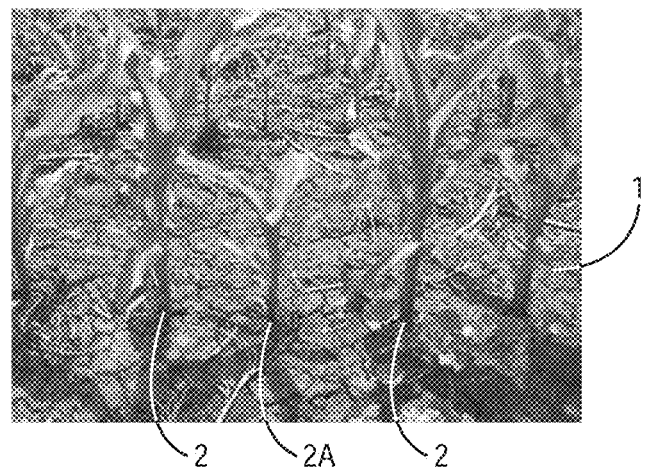
FIG. 4 is a side view of a row of corn plants with a late emerging plant.
Figure 5:
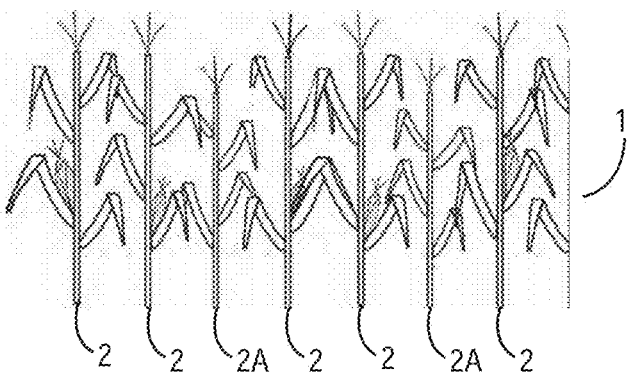
FIG. 5 is a side view of a row of corn plants with late emerging plants.

In addition to missing plants, late emerging plants can also significantly impact yield. Corn plants that emerge later than adjacent plants within a row typically do not match the size of the adjacent plants. Estimates used among those of skill in the art is about a 50% yield loss for plants behind by one leaf and about a 100% yield loss for plants behind two or more leaves. FIG. 4 depicts an exemplary corn plant 2A behind more than two leaves. These late plants 2A can be identified visually at harvest by their characteristic thin stalks and very small ears. FIG. 5 depicts late plants 2A in the row of normal plants 2. Empirically, emerged late plants 2A are about half the size of thriving plants 2. For example, late plants 2A typically have about a 50% thinner stalk size than productive plants 2.

Late plants 2A may be caused by many of the same factors that cause missing plants 3, as discussed above (e.g., planting problems). For example, crop residue in the seed trench can stunt emergence by causing the corn shoot to have to grow around or through the residue. In another example, incorrect seed depth or seed trench closure may cause missing plants 3 or late plants 2A. Planting practices may result in significant yield loss from emerged late plants 2A, sometimes as high as 5% yield loss. As noted above, actions taken to correct or prevent late plants are often different than actions to correct a full stand low yield.

Figure 6:
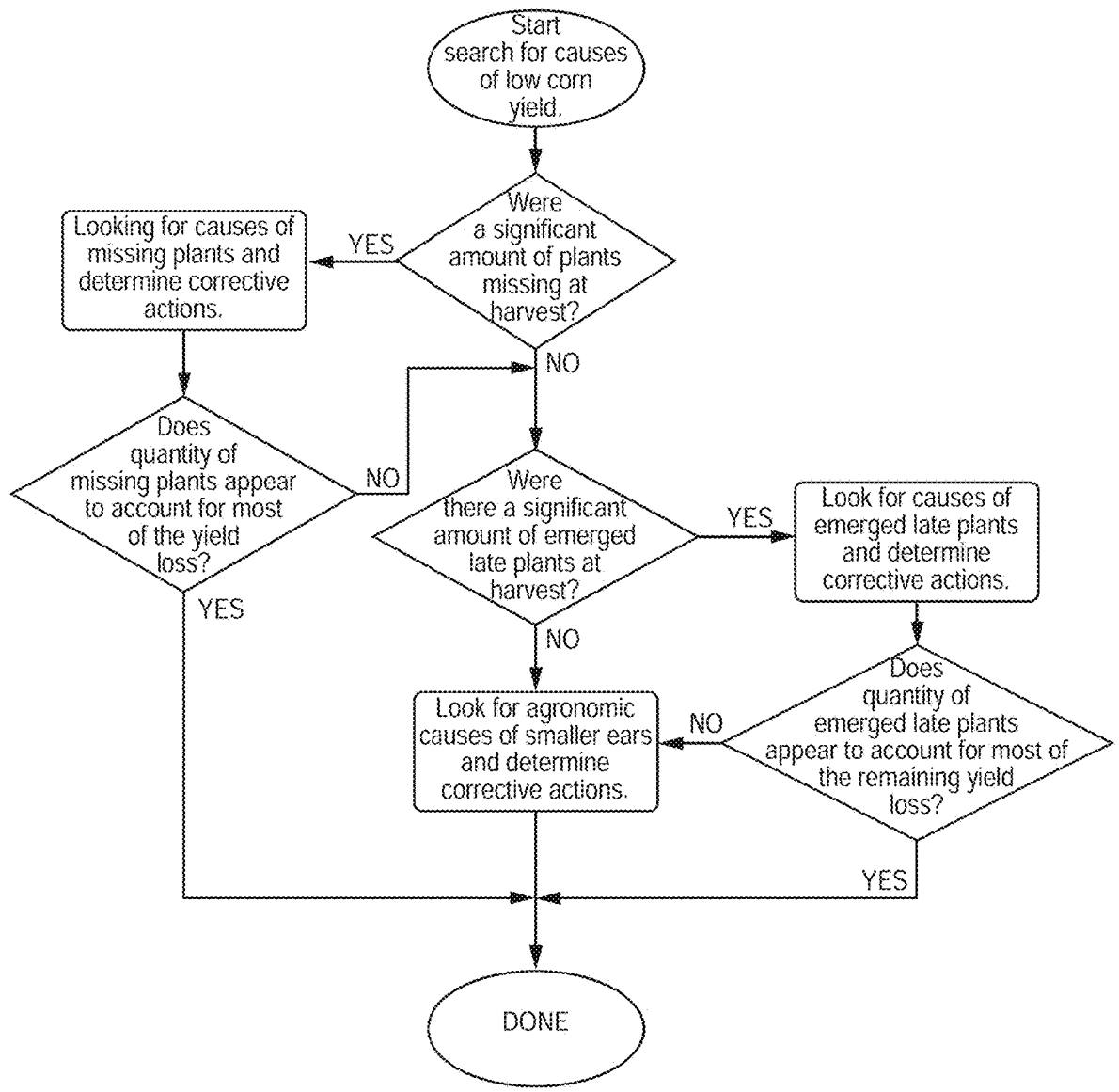
FIG. 6 is a flow chart for troubleshooting low yield areas.

Correctly assessing the cause of low yield is important for stakeholders to be able to determine the appropriate corrections that may be made to improve future yields. FIG. 6 is a flow chart depicting an exemplary implementation of a process tree for assessing and determining the cause of low yields in a planting environment. The ability to determine the number and location of missing plants 3 and late emerged plants 2A within an area or entire field is addressed by the system 10 and associated devices and other components disclosed herein. This quantification and identification is valuable to assessing appropriate action(s) to improve future yields. Erroneous and/or economically wasteful corrective actions can be taken if missing plants 3 and emerged late plants 2A are not considered when evaluating the cause of low yields. In one example, practitioners may assume a full stand and prescribe application of extra fertilizer in low yielding areas absent missing plant 3 or late emerging plant 2A data. This extra fertilizer may be unnecessary if missing plants 3 from mechanical planter problems are the cause of the low yield, and resolving the mechanical issue is what is needed to improve yield. These and other types of errors may be prevented by considering missing plants and late emerged plants as a possible cause for low yields.

Figure 7:
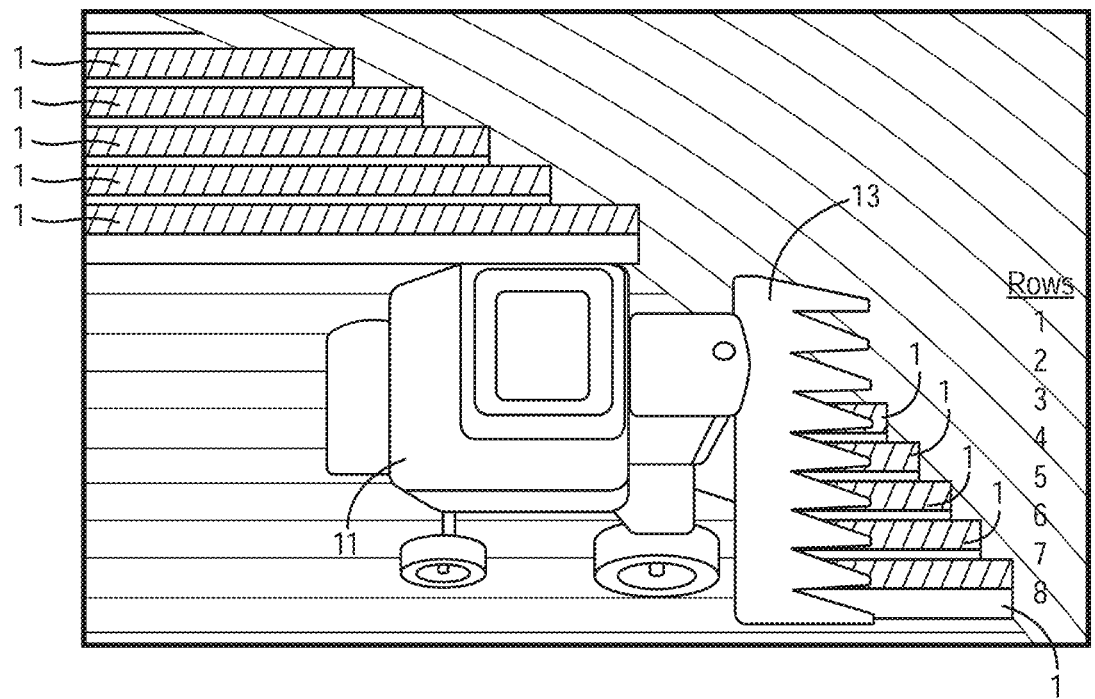
FIG. 7 is a top view of a harvester in a field, according to one implementation.

Turning to FIG. 7, known yield monitors use a header 13 having a height sensor to trigger area counting on and off. That is, raising the head 13 above a certain height triggers area counting off and lowering the head 13 triggers area counting on. An issue can arise because the head 13 is not always harvesting all rows 1 when it is down and therefore may over count an area. Various yield monitors may utilize an "auto swath" feature that automatically shuts off area counting for any corn head row over an already harvested area. Use of such an "auto swath" feature requires an expensive high accuracy GPS receiver to spatially detect which corn head row or rows should be shutoff.

The disclosed agricultural system 10, data visualization system 18, sensor assemblies 20 and associated devices and methods address the issues described above by providing accurate stalk counts, stalk measurements, and corresponding data visualization. Those of skill in the art will readily appreciate that the various features described herein can be used independently or in combination.

I. Sensors

Figure 8:
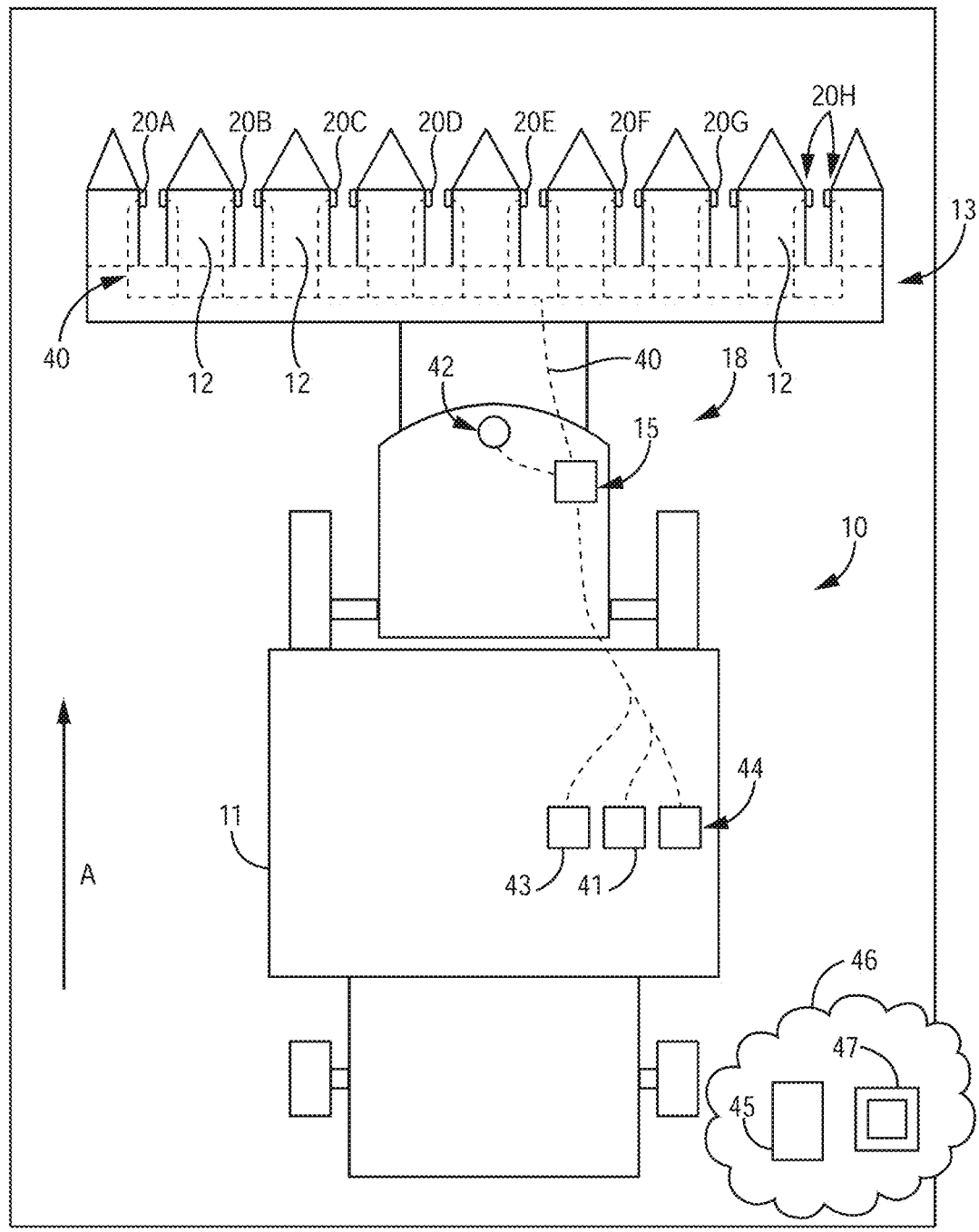
FIG. 8 is a top view of a harvester, according to one implementation.

FIG. 8 depicts an implementation of the system 10 having a harvester 11 with stalk sensor assemblies 20A-20H disposed on each row unit 12 of a corn head 13. The sensor assemblies 20 according to these implementations are constructed and arranged to detect and measure plant stalks 2. For example, various implementations of the sensor assembly 20 are depicted in FIGS. 9B-15B. In various of these and other implementations, the sensor assemblies 20 include rotational stalk sensors that are constructed and arranged to measure the perimeter of each stalk, or other stalk characteristics specific to the individual sensor type. In any event, these sensors 20 mechanically engage or otherwise interact with passing plant stalks to detect and measure plant stalks on an individual plant and row-by-row basis.

Figure 9A:
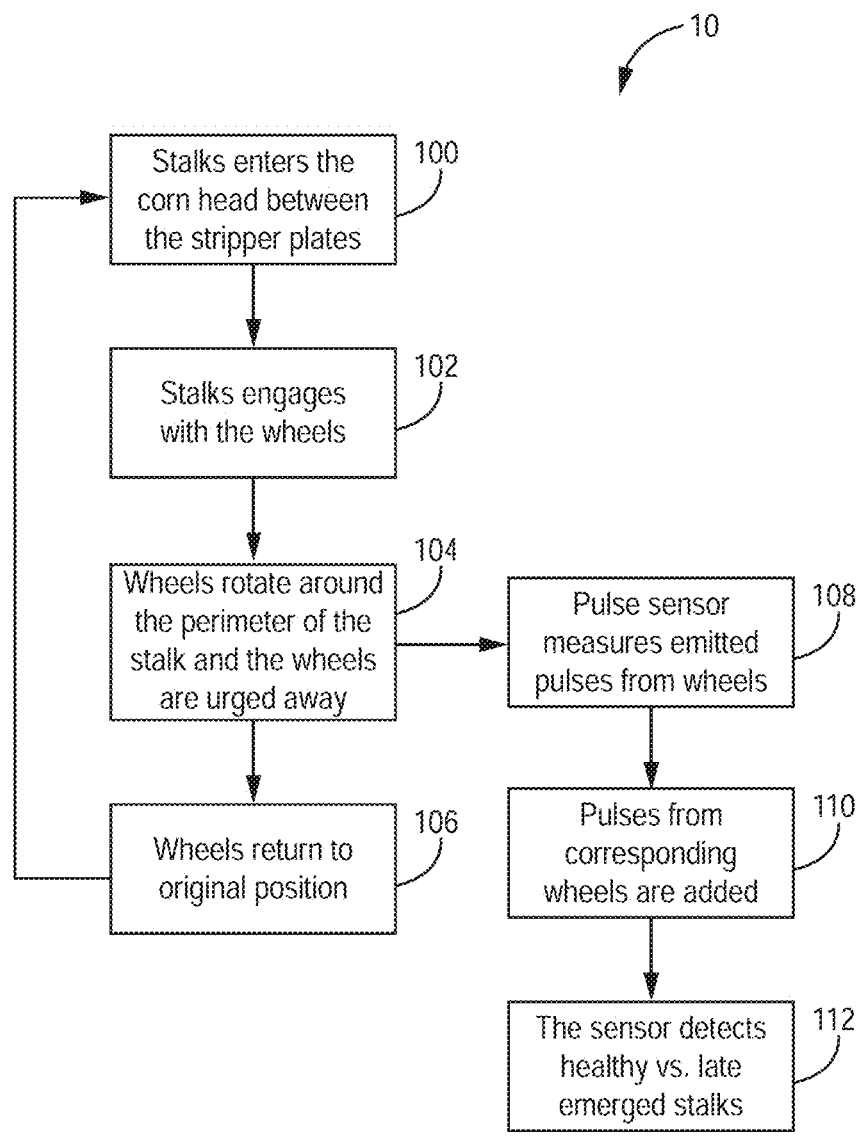
FIG. 9A is a process diagram showing the operation of the sensory assembly, according to one implementation.
Figure 9B:
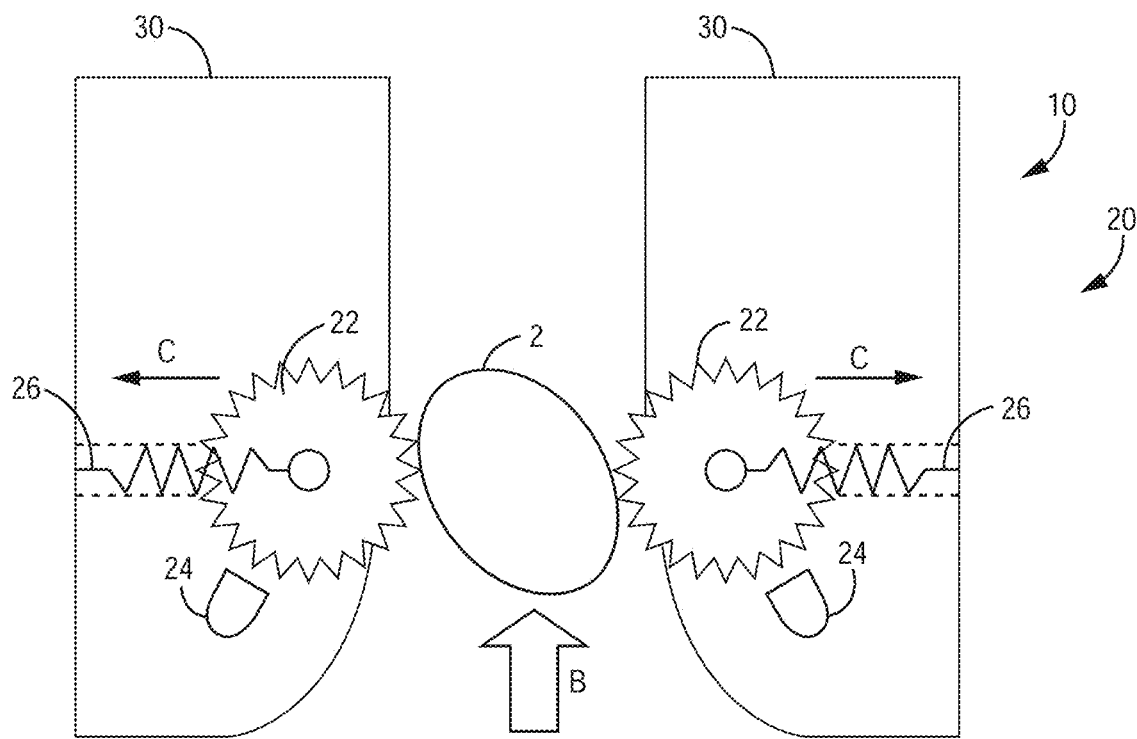
FIG. 9B is a model implementation of a sensor assembly, according to one implementation.

FIG. 9A-9B depict a model process diagram for an agricultural system 10 having a model sensor assembly 20, according to certain exemplary implementations. FIGS. 9B, 10A, 11A, 12A, 13A, 14A and 15A depict various implementations and components of the sensor assembly 20, while FIGS. 9C, 10B, 11B, 12B, 13B, 14B and 15B depict graphical representations of total rotation per unit time, according to their respective implementations.

Looking at FIGS. 9A-9B, FIG. 9A depicts a process diagram and FIG. 9B depicts certain components of an exemplary implementation of the system 10.

In these implementations, the sensor assembly 20 consists of two wheels 22 or other pulse generating devices. The wheels 22 engage with and rotate around a stalk 2—as the stalk 2 enters and traverses through the corn head 13 in the direction of reference arrow B. In some implementations, the wheels 22 have teeth to grip and thereby engage with the stalk 2. In various other implementations, the wheels 22 may have a smooth surface with a high friction or other gripping material such as rubber or the like disposed along the contact edges of the wheels 22, in order to engage with the stalk 2. In various implementations, the gripping material may be any type of rubber material, as would be appreciated by those of skill in the art.

As the stalk 2 traverses through the corn head 13 the wheels 22 are engaged by the stalk 2 and the wheels 22 rotate about their axes. As the wheels 22 rotate a pulse sensor 24 or other sensor measures the amount of rotation of the wheel 22 via electrical or other pulses. In various implementations, a known amount of electrical pulses are symmetrically generated per revolution of the wheel 22. For example, one electrical pulse may be generated for every ½5 turn of the wheel 22, such that twenty-five pulses will be emitted for each full revolution of the wheel 22. In various other implementations—where the wheels 22 have teeth—the pulse sensor 24 may count the number of teeth that pass the sensor 24 per rotation. Various pulse sensors 24 are known and understood in the art. For example, the pulse sensor 24 may be an encoder, a gear teeth sensor, or other sensor as would be appreciated by those of skill in the art.

It is further understood that in the various implementations of the sensor assembly 20, the various components described herein are in operational communication with the visualization system 18 and/or any of the components described in relation to FIG. 8 that are capable of recording and storing digital or electronic information collected via the pulse sensors 26 and other components, as would be well-understood by those of skill in the art.

Figure 22:
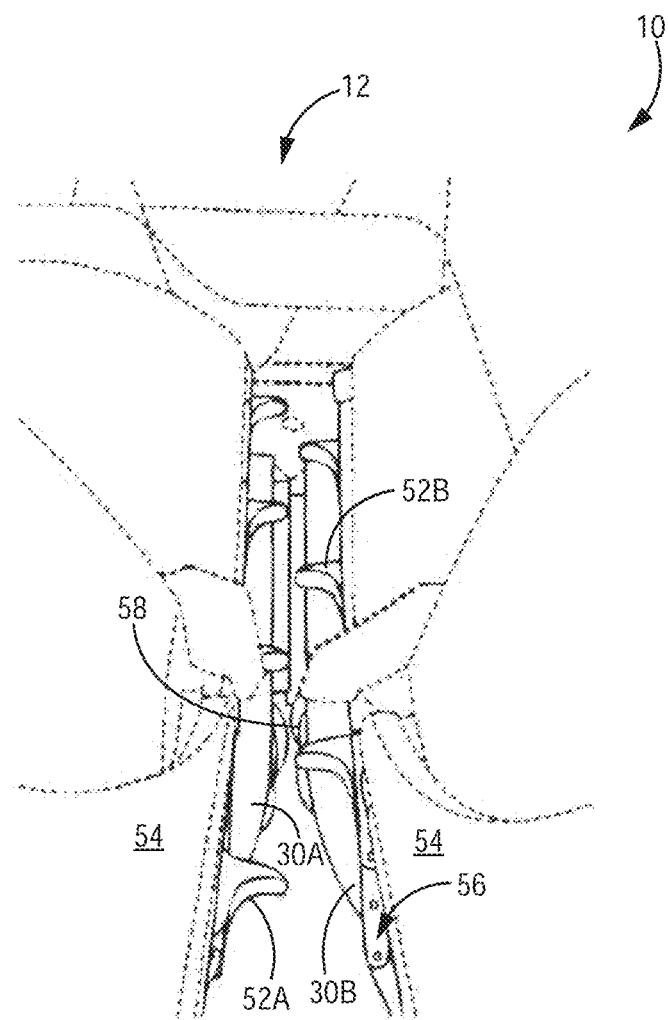
FIG. 22 is a top view of a row unit, according to one implementation.

In some implementations, the sensor assembly 20 is mounted under each stripper plate 30 in front of the stalk rolls (shown in FIG. 22). In various alternative implementations, the sensor assembly 20 is mounted above the stripper plates 30.

Continuing with the implementations of FIGS. 9A-9B, the sensor assembly 20 operates such that a stalk 2 enters the corn head 13 (shown at reference arrow B) between the stripper plates 30 (box 100 in FIG. 9A), the stalk 2 engages the wheels 22 (box 102 in FIG. 9A) and the wheels 22 rotate and are urged angularly away from the stalk 2 (shown at reference arrow C) against a resilient member 26 (box 104 in FIG. 9A). The resilient member 26 allows the wheels 22 to move such that the stalk 2 can continue traverse through the stripper plates 30.

Continuing with FIGS. 9A-9B, the resilient members 26 also urge the wheels 22 toward the stalk 2—such that the wheels 22 remain engaged with the stalk 2 and the wheels 22 are properly rotated about the entire circumference of the stalk 2. Once the stalk 2 passes the wheels 22, the wheels 22 are urged back to a return position by the resilient members 26 (box 106 in FIG. 9A).

According to these implementations, as the stalk 2 is rotating the wheels 22, one or more pulse sensors 24 are detecting and measuring the emitted electrical pulse from the wheel (box 108 in FIG. 9). The system 10 may then add the number of emitted pulses from the corresponding wheels 22 on both sides of the stalk 2. The system 10 then can generate output corresponding to if the stalk 2—that passed through the sensor assembly 20—was a healthy stalk 2 or a late emerged stalk (box 112 in FIG. 9A).

Figure 9C:
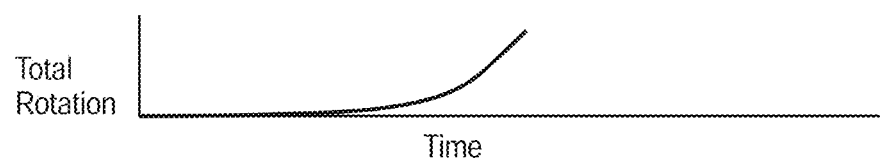
FIG. 9C is a model graph showing total rotation per unit time, according to the implementation of FIG. 9B.

FIG. 9C depicts a graphical representation of the total rotation of the wheels 22 over time, which may be used to quantify or otherwise estimate the size of the stalk 2, as discussed below. In use, it is thus understood that the wheels 22 start turning when a stalk 2 begins driving itself through the sensor assembly 20. That is, the wheels 22 rotate around the circumference (or perimeter) of the stalk 2. Each wheel 22 is constructed to emit pulses proportional to the degree of rotation, which are received by the pulse sensor 24, as described above. These pulses and/or other signals of degrees of rotation are added from both wheels 22—thereby detecting the entire circumference of the stalk 2.

Since stalks 2 are approximately circular, and healthy stalks 2 are larger in size than late emerged stalks 2A, healthy stalks 2 produce significantly more degrees of rotation than late emerged stalks 2A. Therefore, as discussed below in relation to Section VI, where the system 10 defines a late emerged threshold-such as a number of degrees of rotation (or pulses)—that threshold serves as a demarcation line for the system 10 to quantify and/or display via the visualization system 18 a quantification or other analysis of productive vs. late emerged stalks. Further implementations can utilize any of the collected data types or measurements in establishing and enforcing the late emerged threshold, such that, for example stalks above the threshold are recorded as productive and stalks below the late emerged threshold are recorded as late emerged by the system 10. For example, stalks above 75° of wheel rotation are productive and below 75° are late emerged, as described further in relation to section VI below. Other implementations are of course possible, some of which utilize statistical techniques, machine learning and/or other artificial intelligence (AI) to establish and calibrate the late emerged threshold.

Most stalks 2 are elliptical, meaning they have a major axis and a minor axis diameter, where major is a larger diameter than minor. Various prior stalk sensors only measure stalk diameter, but due to the elliptical nature of most stalks this type of measurement can introduce error depending on stalk orientation. The system 10 and sensor assembly 20 described herein eliminate this type of error by instead sensing the entire perimeter of a stalk.

It is further understood that the wheels 22 may continue to rotate for a time after a stalk 2 passes, due to the angular momentum of the wheels 22. This continued rotation can cause inaccurate measurements of the stalk 2 perimeter due to the continued rotation and detection of the rotation after the stalk 2 as entirely traversed the sensor assembly 20 and is no longer in contact with the wheels 22. Various methods for addressing this are disclosed below.

In some implementations, the sensor assembly 20 comprises brakes 28 that generate frictional forces opposite the rotation of the wheels 22. The brakes 28 when engaged rapidly reduce and stop the rotation of the wheels 22 when the stalk 2 is no longer in contact with the wheels 22. The brakes 28 are configured to apply the correct amount of braking force when engaged to provide for a rapid deceleration of the rotation of the wheels 22 without causing slippage between the stalk 2 and the wheels 22.

FIGS. 10A-11B depict further implementations of the system 10 comprising one or more brakes 28 to stop the rotation or counting of the rotation of the wheels 22 after the stalk has passed.

Figure 10A:
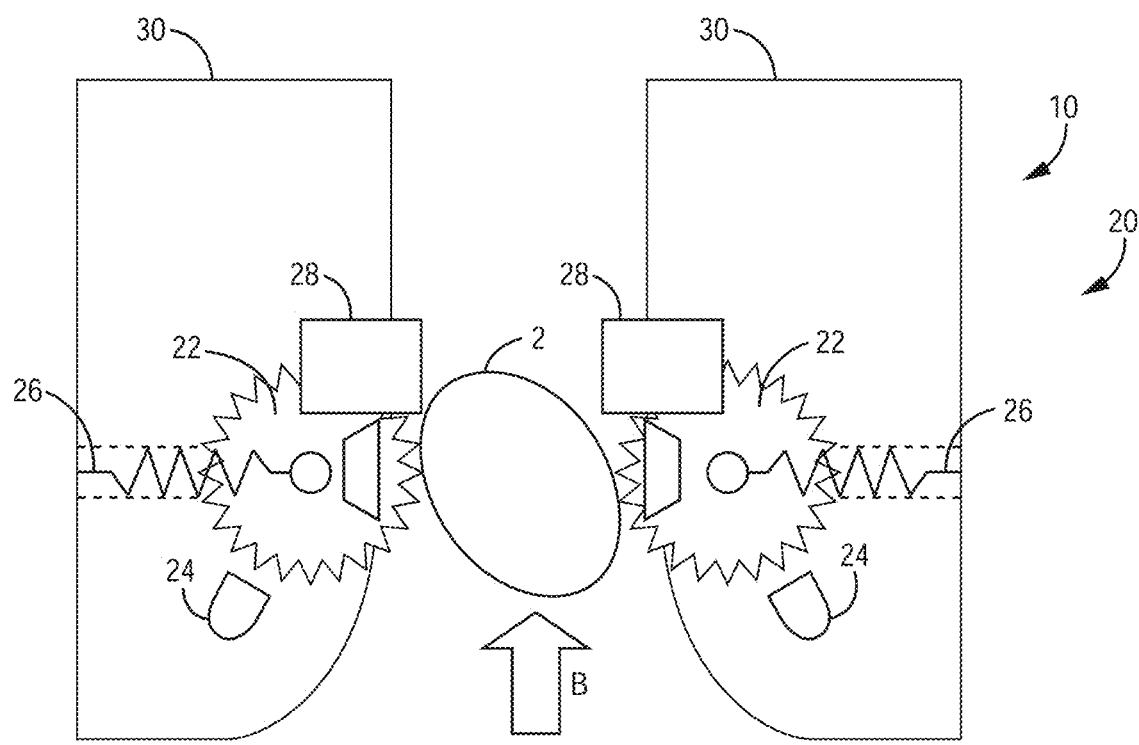
FIG. 10A is a bottom view of a sensor assembly, according to one implementation.
Figure 10B:
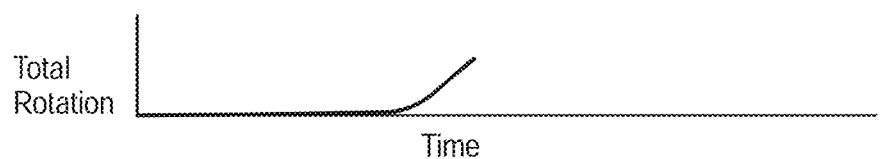
FIG. 10B is a graph showing total rotation per unit of time, according to the implementation of FIG. 10A.
Figure 11A:
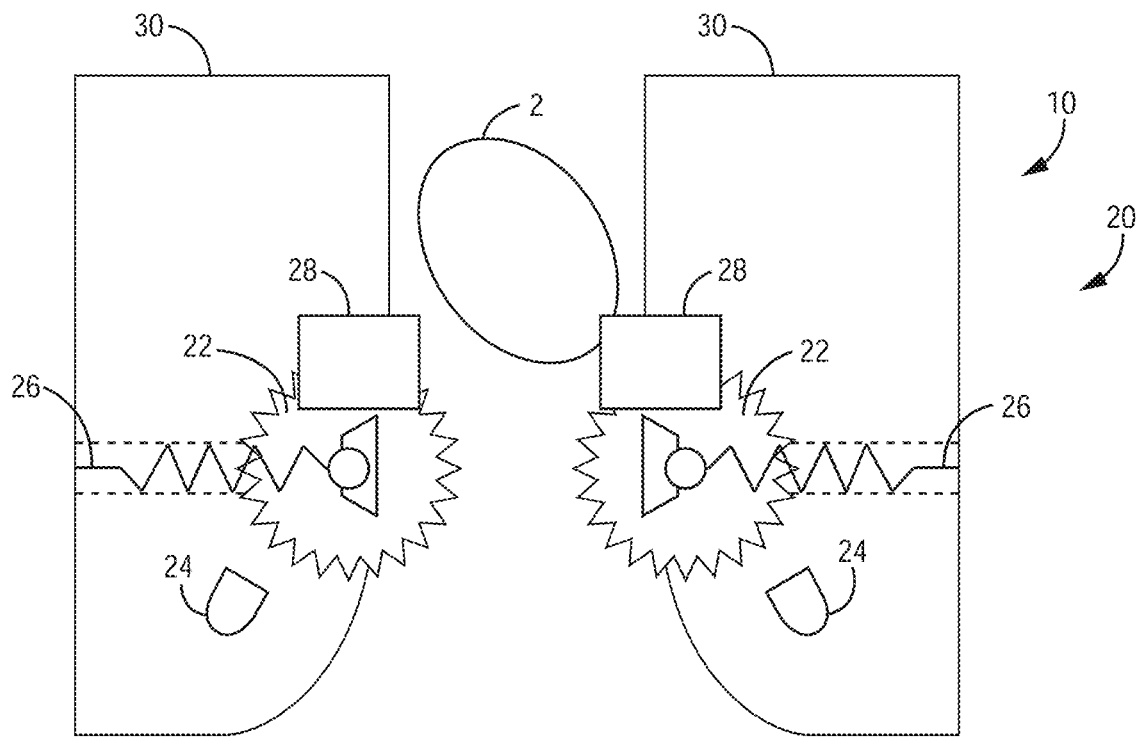
FIG. 11A is a bottom view of a sensor assembly, according to one implementation.
Figure 11B:
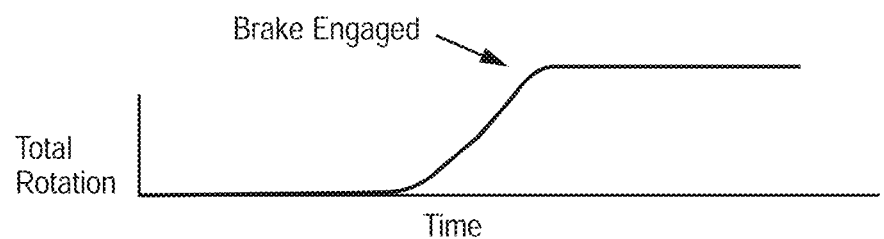
FIG. 11B is a graph showing total rotation per unit of time, according to the implementation of FIG. 11A.

In these implementations, the brake 28 or brakes 28 apply brake friction selectively based on position of the wheels 22. In FIG. 10A, the passing stalk 2 has urged the wheels 22 away from the brakes 28 such that no frictional force is being applied to the wheels 22. The wheels 22 are rotating about the perimeter of the stalk 2 to record the stalk 2 size. FIG. 10B depicts a graphical representation of the total number of rotations per unit of time that both wheels 22 have rotated about the stalk shown in FIG. 10A. In FIG. 11A, the stalk 2 has passed the wheels 22, allowing the springs 26 to urge the wheels 22 into contact with the brakes 28. The brakes 29 then apply frictional forces to halt the wheel 22 rotation, as shown in FIG. 11B.

Further implementations of the system 10 may adjust the frictional force applied based on system feedback. This feedback may include, but is not limited to, deceleration rate of the wheels 22 after a stalk 2 passes, vehicle ground speed, frequency of detected stalks 2, and position of the wheels 22.

In various alternative implementations, as shown in FIGS. 12A-13B, position sensors 32 are implemented in the sensor assembly 20. These position sensors 32 are constructed and arranged to monitor the position and/or operation of the wheels 22. For example, the position sensor 32 may monitor whether the wheels 22 have returned to a defined position indicating that the stalk 2 has passed. Additionally, the position sensors 32 may monitor when the wheels 22 have been urged away from the stalk 2 as the stalk 2 enters the sensor assembly 20. This position information is then used to process the rotational signals emitted by the wheels 22 and sensed by the pulse sensors 24. The position sensor 32 indicates when to start and stop counting rotation of the wheels 22.

Figure 12A:
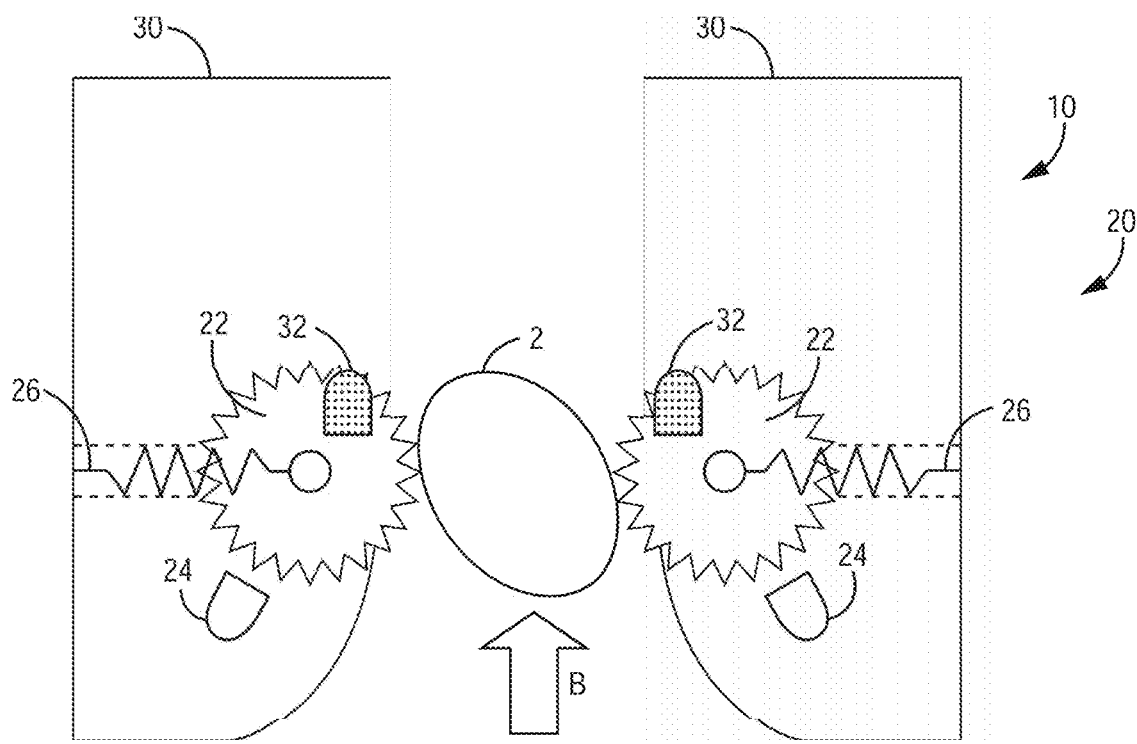
FIG. 12A is a bottom view of a sensor assembly, according to one implementation.
Figure 12B:
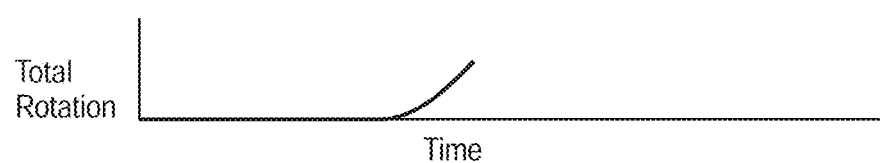
FIG. 12B is a graph showing total rotation per unit time, according to the implementation of FIG. 12A.
Figure 13A:
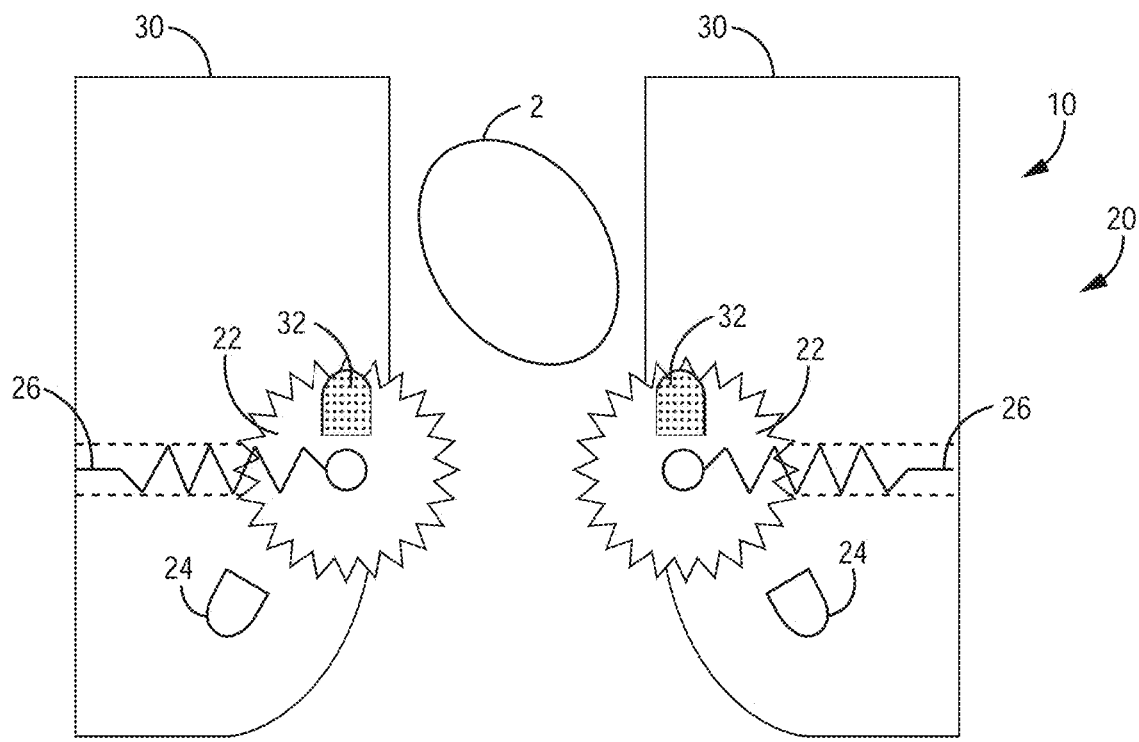
FIG. 13A is a bottom view of a sensor assembly, according to one implementation.
Figure 13B:
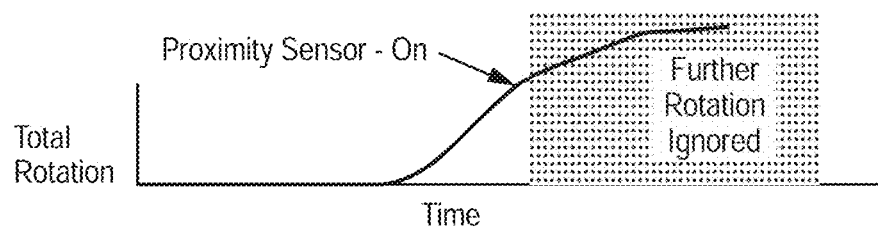
FIG. 13B is a graph showing total rotation per unit time, according to the implementation of FIG. 13A.
Figure 14A:
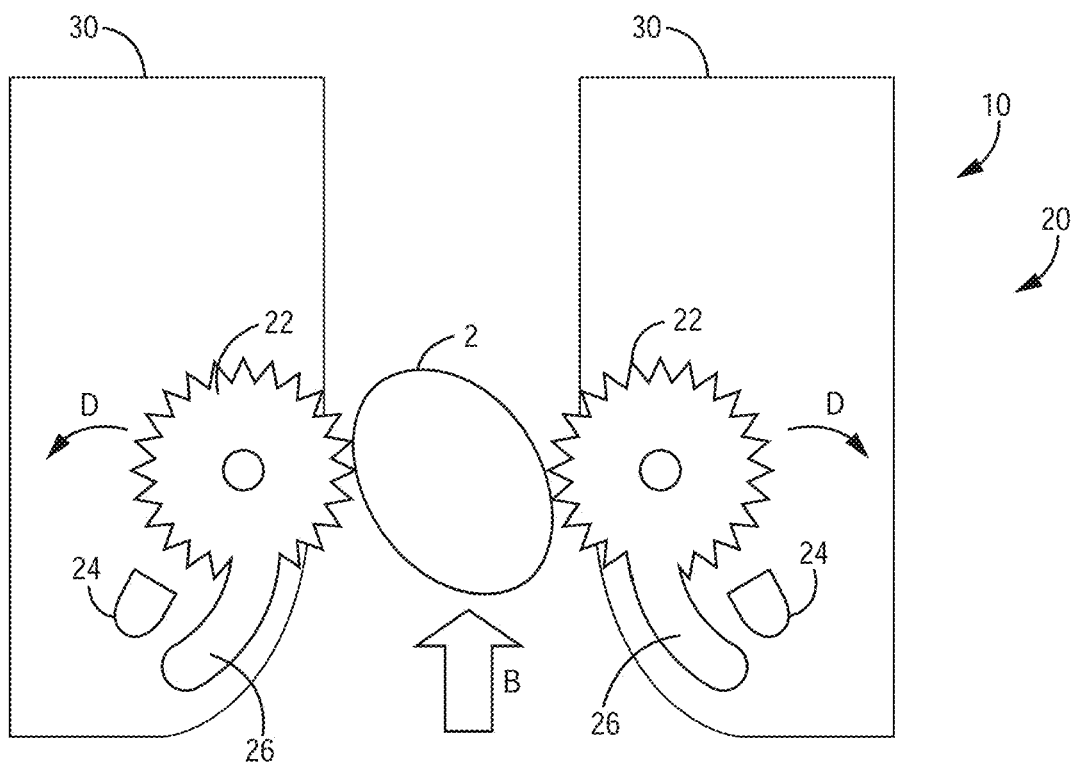
FIG. 14A is a bottom view of a sensor assembly, according to one implementation.
Figure 14B:
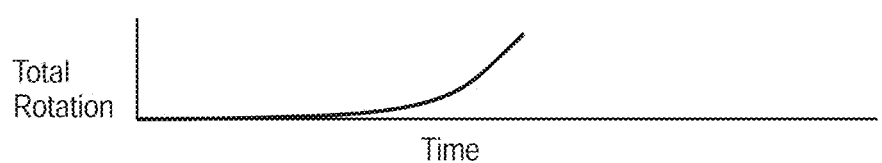
FIG. 14B is a graph showing total rotation per unit time, according to the implementation of FIG. 14A.
Figure 15A:
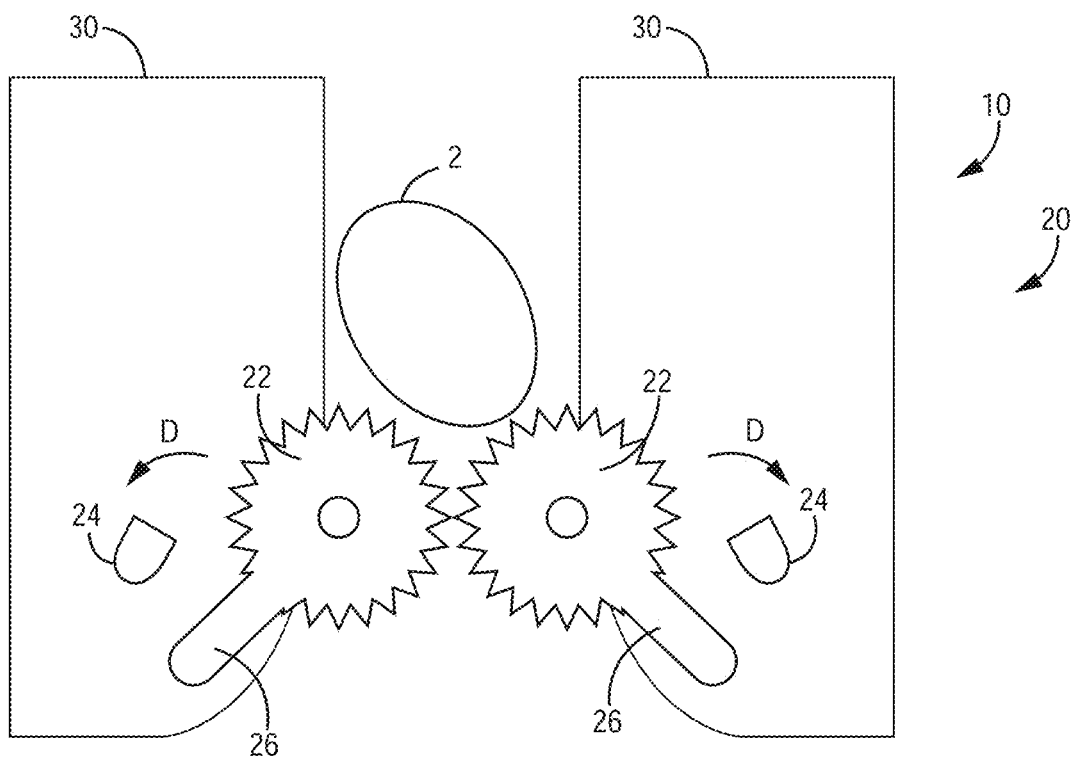
FIG. 15A is a bottom view of a sensor assembly, according to one implementation.
Figure 15B:
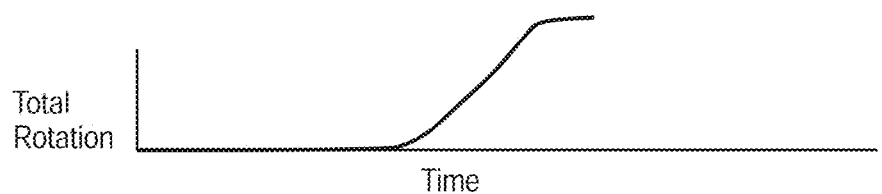
FIG. 15B is a graph showing total rotation per unit time, according to the implementation of FIG. 15A.

FIGS. 12A-13B demonstrate the use of such proximity sensors 32 to monitor position. In FIG. 12A, the passing stalk 2 has forced the wheels 22 away from the proximity sensors 32, such that rotations begin to be counted, as shown in FIG. 12B. In FIG. 13A, the stalk 2 has passed, allowing the springs 26 to urge the wheels 22 back into position adjacent to the proximity sensors 32. FIG. 13B shows when further rotation of the wheels 22 should be ignored due to the wheels 22 returning to a position engaged with the proximity sensors 32. When the proximity sensors 32 are triggered, the system 10 ignores additional rotation signals until the proximity sensors 32 are again displaced.

In another implementation, shown in FIGS. 14A-15B, the resilient members 26 may be a resilient arm 26. The resilient arm 26 is rigidly attached to the stripper plate 30 at a first end and the wheel 22 is mounted at the second end. In various implementations, the resilient arm 26 is made of an elastomer material, such as, but not limited to, polyisoprene, polybutadiene, polyisobutylene, and polyurethanes. The resilient member is constructed and arranged such that as the stalks 2 pass through the sensor assembly 20 the wheels 22 are urged out of the way causing the resilient member 26 to flex in the direction of reference arrow D. After the stalk 2, completely traverses through the sensor assembly 20, the resilient members 26 straighten or "snap" back into their original position.

The implementation of FIGS. 14A-15B may be used in conjunction with either or both of the brakes 28 and the proximity sensors 32, discussed above.

Figure 16:
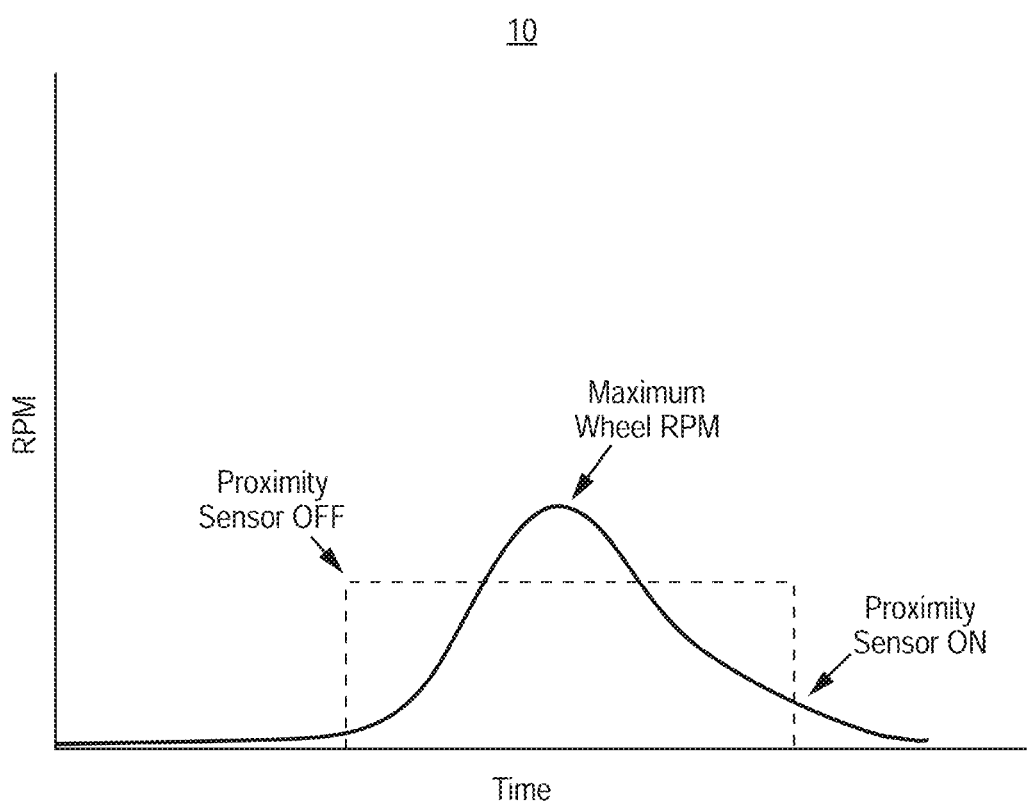
FIG. 16 is a graph showing revolutions per minute per unit time, according to one implementation.

Various additional sensor implementations may employ the use of brakes 28 and/or proximity sensors 32 along with a maximum revolutions-per-minute ("RPM") cutoff. After the stalk 2 passes through the sensor assembly 20, the brakes 28 are engaged to slow the wheels 22. As shown in FIG. 16, the wheel(s) 22 reach a maximum RPM when the stalk 2 disengages from the wheels 22. As such, a maximum RPM can be used to serve as an indicator for when to stop recording additional rotation of the wheels 22. It is understood that there is no single defined maximum RPM, instead the system stops reading/recording rotation when each wheel 22 reaches its peak or maximum RPM. The maximum RPM can vary from stalk to stalk according to ground speed and stalk size.

In these and other implementations, the sensor assembly 20 begins recording degrees rotation when the proximity sensor 32 signals off-when a stalk 2 enters the sensor assembly 20. The sensor assembly 20 continues to count and record rotations until the maximum RPM is reached. In various implementations, the RPM value is calculated by the pulse sensor 24. The sensor assembly 20 then stops counting and recording rotation when the maximum RPM is reached. By only counting the revolutions prior to reaching the maximum RPM, the sensor assembly 20 may be more accurate in measuring stalk 2 perimeter because the sensor assembly 20 will not count the additional rotations while the wheels 22 are moving into contact with the brakes 28 or to engage with the proximity sensors 32.

II. Data Visualization

Turning back to FIG. 8, in these and other implementations of the agricultural system 10, the stalk sensor assemblies 20 are in communication with an electronic recording and visualization system 18. In various implementations, the visualization system 18 has an in-cab display 15 and is interconnected with the sensor assemblies 20 through a wired or wireless connection 40. In various implementations, the visualization system 18 communicates with a GPS receiver 42 and a yield monitor system 44. It is appreciated that further hardware components are also in operational communication with these components and are constructed and arranged to effectuate the systems and processes described herein. That is, in various implementations, one or more processors 41 and physical storage media 43 are disposed in the harvester 11 or are otherwise accessible by the visualization system 18, such as via a wired connection or a wireless connection such as an LTE or other cellular or Wi-Fi connection.

It is further understood that the visualization system 18, according to certain implementations, has or is otherwise connected to a server 45, database 47 and other components necessary for calculation, processing, transmitting and otherwise storing data for use by the visualization system 18, as described herein. Various of these components such as the server 45 and database 47 may be stored and accessed via a cloud 46 based platform. Alternate implementations comprise other hardware and software components necessary for effecting the processes described herein.

Continuing with the exemplary implementation of FIG. 8, in certain implementations, the various stalk sensor assemblies 20, discussed above, may—in addition to counting and measuring plants 2—detect late plants 2A, plugged rows, and trigger area counting on/off. In some implementations, independent sensor assemblies 20 may be provided for each function: counting, plugging, area counting, and others functions as would be appreciated. It would also be appreciated that in some implementations, not every row unit 12 may require a stalk sensor assembly 20. That is, in certain implementations, patterns unique to certain field scale conditions, like hybrid type, planting date, tillage, and the like can be detected by instrumenting only some of the corn head rows 12. The system 10 may function with or without a yield monitor 44 or a GPS receiver 42.

Each stalk sensor assembly 20, according to certain implementations, is assigned a row number to denote a row unit 12 of a corn head 13 (shown as 20A, 20B, 20C, etc.). It is appreciated that by convention corn head 13 row units 12 are commonly numbered from left to right with respect to forward travel direction (shown as reference arrow A). Distance offsets may be used to locate the various sensors assemblies 20 relative to the mounted GPS receiver 42 location on the harvester 11.

In further implementations, each stalk sensor assembly 20 independently counts and measures stalks 2 entering the respective corn head 13 row unit 12 and may, in certain implementations, determine a quantity of harvested plants 2, missing plants 3, emerged late plants 2A as well as row plugged and row area counting on/off status, among other characteristics of the plant/row. Further implementations are of course possible.

Figure 17:
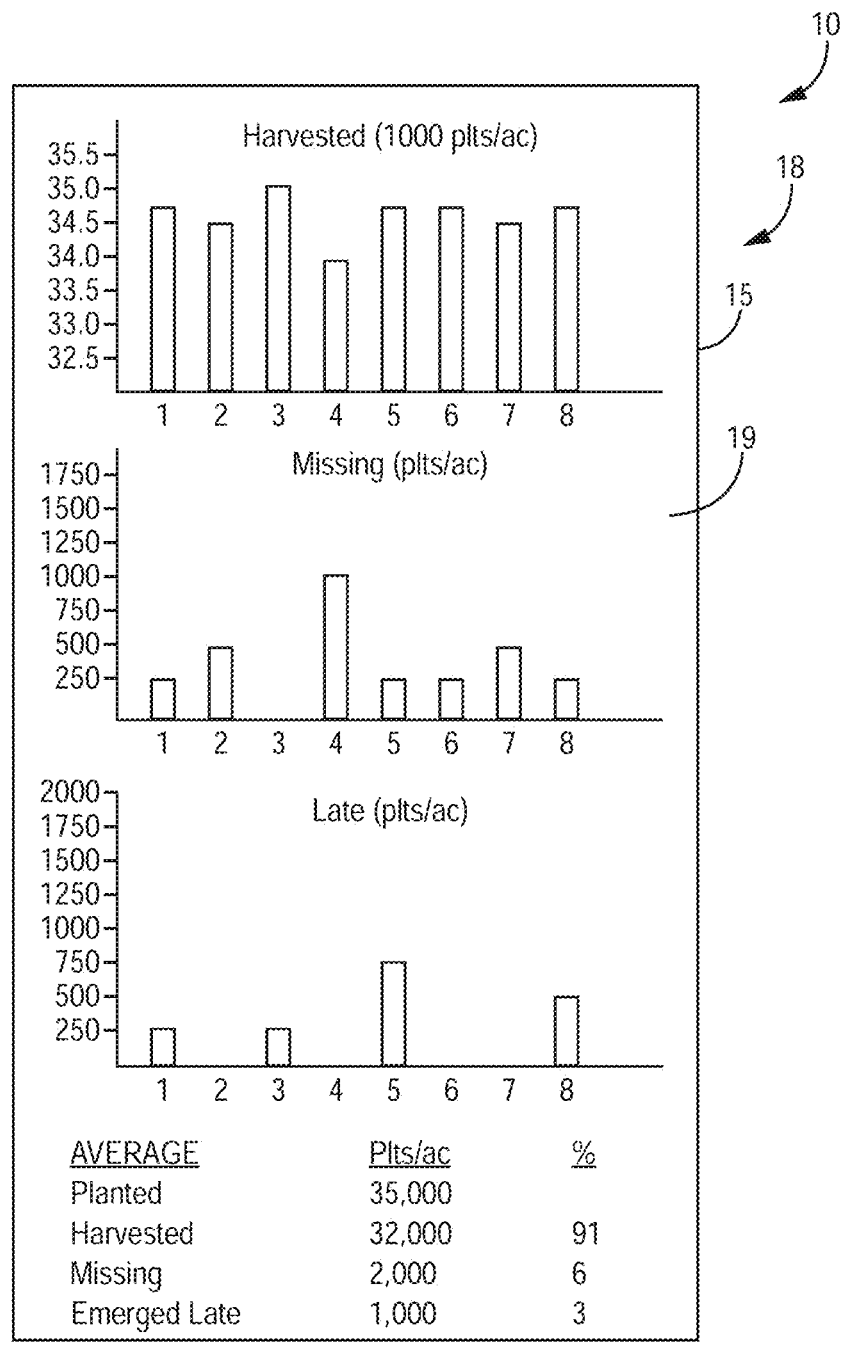
FIG. 17 depicts an exemplary user interface, according to one implementation

FIG. 17 for example depicts an exemplary user interface 19 of a row-by-row bar graph of on-the-go or instantaneous data from each stalk sensor assembly 20 (shown in FIGS. 8, 9B, 10A, 11A, 12A, 13A, 14A, and 15A at 20) which may appear via the visualization system 18 on the in-cab display 15. It should be appreciated that all stalk sensor assembly 20 data, such as the row-by-row bar graph data, can be visualized in many different formats. For example, the data may appear in the user interface 19, as a numerical display or a row-by-row color map with a legend indicating magnitude of each parameter.

III. Harvested Plants

Various implementations of the agricultural system 10 assess the quantity of harvested plants. Harvested plants are a count of corn stalks 2 harvested by each row unit 12 of the corn head 13. The stalk sensor assembly 20 and associated system 10 may be constructed and arranged to allow a user to optionally exclude emerged late plants 2A from harvested plants 2. This ability is useful because, as discussed above, emerged late plants 2A do not contribute any significant yield and therefore the technique allows for quantifying only the productive corn plants 2.

In some implementations, harvested plants 2 can be visualized as plants per area or as a percent of planted seeds per area. The harvested plant data may be displayed in real-time or near real-time on a row-by-row basis (shown for example in FIG. 17). The data can also be in numerical form or a color map with a legend indicating harvested plant magnitude. In various implementations, harvested plants 2 can be visualized as an average across all rows. The average may be expressed in different visualization forms, such as a bar graph, numerically, a color map with a legend indicating magnitude of harvested plants, and/or other forms as would be appreciated by those of skill in the art. In some implementations, the average harvested plants can be visualized and compared by treatment, such as by hybrid, tillage or planter treatments.

In various implementations, the number of harvested plants 2 is interchangeable with the ear count. This is because nearly all corn stalks 2 only have one ear 4, therefore the number of harvested plants 2 is typically about equal to the number of productive ears 4. This relationship is more accurate in implementations wherein emerged late plants 2A are excluded from the number of harvested plants 2. In this disclosure, the use of ear count is interchangeable with the use of harvested plants 2.

IV. Missing Plants

The system 10, according to certain implementations, is constructed and arranged to calculate, display, log and map missing plants 3 via the visualization system 18. Counting and mapping missing plants 3 is valuable to various stakeholders because, as discussed above, corn plants 2 adjacent to missing plants 3 either do not compensate for the yield lost from a missing plant 3 or the compensation is negligible. For this reason, missing plants 3 often represent the largest economic impact of any parameter that the corn stalk sensor assembly 20, discussed herein, measures.

Figure 18A:
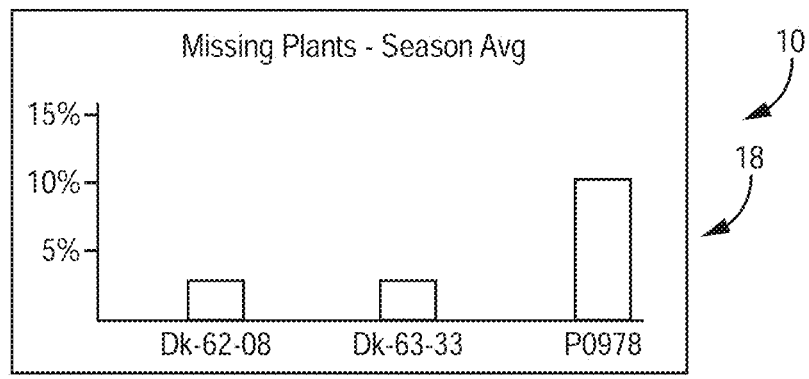
FIG. 18A depicts an exemplary user interface showing missing plant data, according to one implementation.
Figure 18B:
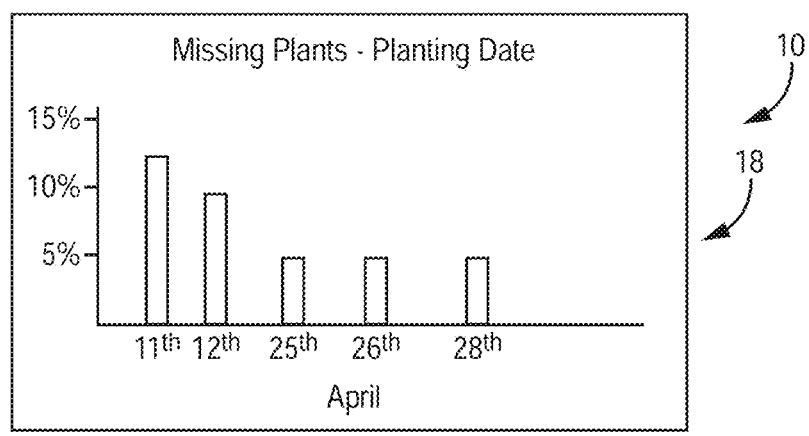
FIG. 18B depicts an exemplary user interface showing missing plant data, according to one implementation

In some implementations, missing plants 3 can be visualized in real-time or near real-time on a row-by-row basis via the visualization system 18, as shown in FIG. 17. The missing plant 3 data can also be in numerical form or a color map with a legend indicating missing plant magnitude. In these and other implementations, missing plants 3 can also be visualized as an average across all rows. In addition, the missing plants can also be visualized as a percent of missing plants based on different treatments, like planting date or hybrids, as shown in FIGS. 18A and 18B. The average can be expressed in different visualization forms, such bar graph, numerically or a color map with a legend indicating magnitude of missing plants 3.

V. Quantification

Various approaches to the visualization system 18 are configured for quantifying missing plants 3, such as those discovered via the sensor assemblies 20. According to one implementation, the system 10 may determine missing plants by subtracting stalks counted by the stalk sensor assemblies 20 from the quantity of seeds planted where the harvester 11 is harvesting. For example, if the stalk sensor assemblies 20 count 30,000 harvested plants/ac in an area in which the planter planted 32,000 seeds/ac, the system 10 subtracts 32,000-30,000, and then displays and records 2,000 missing plants per acre. The planted seed quantity may be expressed as a seeding rate (number of seeds planted per area) and may come from "as-planted" information electronically and spatially recorded by the planter system.

Farmers and other practitioners may have access to "as-planted" information during harvest by use of the same visualization system 18 and display 15 in the harvester 11 as the planter. In some implementations, the harvester 11 display 15 is different than the planter display and the "as-planted" information can be downloaded from a cloud storage system or any other file transfer means known to those of skill in the art. In various implementations, the "as-planted" seeding rate may be derived from planter seed sensor readings, a manually-entered target seeding rate into the planter system, or a prescription seeding rate map. In implementations where field areas are planted at a single seeding rate, the user can enter a target seeding rate into the system 10.

In alternate implementations, missing plants 3 can be calculated without user entered seeding rates or "as-planted" seeding rate information by using stalk sensor assemblies 20 to measure the average corn plant spacing at harvest. Corn planted at a fixed seeding rate has a theoretical target seed spacing. For example, corn planted at 32,000 seeds per acre at 30-inch row spacings are typically spaced about 6.5 inches apart. Planters are typically not capable of spacing every seed exactly 6.5 inches apart; however, average seed spacing within a field as measured by planter monitors are typically close to the target spacing (in this example 6.5 inches). Because seeds do not move in the soil, corn stalk sensor assemblies 20 can measure the space between every plant at harvest and calculate the same average seed spacing as the planter monitor.

Stalk sensor assemblies 20 determine seed spacing by measuring the distance the harvester 11 travels between each counted stalk 2. The system 10 according to certain implementations calculates distance traveled from a harvester 11 ground speed source, such as GPS, radar, transmission speed sensor, or other source known to those of skill in the art. In various implementations, the system 10 records a field average plant spacing and updates the value as new stalks are harvested and counted. The system 10 may then back calculate the original target seeding rate using the corn head 13 row unit 12 space setting and the stalk sensor assembly 20 average plant spacing.

In one example, the target seeding rate (seeds/ac) is:

$$\frac{6{,}272{,}640 \text{ (seeds)}}{\text{average plant spacing (inches)} \times \text{row spacing (inches)}}$$

In another example, the target seeding rate (seeds/hectare) is:

$$\frac{100{,}000000 \text{ (seeds)}}{\text{average plant spacing (cm)} \times \text{row spacing (cm)}}$$

As described above, the calculated target seeding rate minus counted stalks calculates the missing plant quantity.

In certain implementations, the system 10 visualization system 18 quantifies missing plants as plants per area or as a percent of planted seeds. For example, if the stalk sensor assemblies 20 count 30,000 harvested plants/ac in an area where the planter planted 32,000 seeds/ac, the system 10 calculates, displays and records 2,000 missing plants or stated another way 6.25% missing plants. Missing plants expressed on a percent basis can be a more useful metric in certain circumstances than plants/area. For example, different treatments like corn hybrids or planting date may characteristically produce a certain percentage of missing plants, regardless of the planted seeding rate. The ability to compare treatments on a percentage basis exposes the proportional tendency of the treatment.

FIG. 18A shows missing plant trends for various exemplary hybrid types. FIG. 18B shows a proportional tendency for more missing plants at earlier planting dates compared to later planting dates, independent of the planted seeding rate. Other treatments that may be compared including, but not limited to, planting depth, row unit down force, soil moisture, soil temperature, seed to soil contact, tillage depth, fertilizer rate, and others as would be appreciated by those of skill in the art.

VI. Late Emergence

In some implementations, the agricultural system 10 measures the quantity of late emerged plants, as was also discussed above in relation to FIG. 9B-C. In certain of these implementations, late emergence is quantified by detecting the stalk size proximate the plant bottom, approximately the first 0-3 feet of stalk above ground. As discussed above, late emerged plants 2A stalk size can be approximately half the stalk size of a productive plant 2. The stalk size may be in terms of cross-sectional stalk area, circumference, or perimeter, as discussed above. Exemplary stalk sensor assemblies 20 measuring and distinguishing between late and productive plants are described throughout this disclosure, and the processing and display of collected data about late emergence can be achieved via the visualization system 18 implementations discussed variously herein such as in relation to FIG. 8.

Late emerged plants can be expressed, recorded, logged, mapped, displayed and otherwise visualized with the same units and user interface 19 techniques as described above with respect to missing plants, as would be readily appreciated by the skilled artisan.

VII. Yield Per Plant or Area

In various implementations of the system 10, corn yield can be measured in yield units per area ("YPA"), for example, bushels/acre or metric tons/hectare. Corn hybrids, fertilizer rates, seeding rates and many other agronomic and mechanical treatments are compared on a YPA basis. The corn stalk sensor assemblies 20, in combination with a yield monitor 44 integrated with the operations system of the visualization system 18 are configured to measure yield characteristics, such as yield per plant. The yield per plant is typically a very small number, and as such it may be useful to express yield per 1000 plants or other value.

As described herein, yield per 1000 plants may be expressed as YPK. The YPA may be expressed as the BPA or bushels per acre. The yield per 1000 plants in bushels may be expressed as BPK. In some implementations, yield per plant can be calculated from YPA, derived from the yield monitor 44, divided by the quantity of harvested plants derived from the stalk sensor assemblies 20.

Figure 19:
FIG. 19 shows exemplary harvest data.

In a specific example, shown in FIG. 19, a yield monitor 44 measures 250 bu/ac and stalk sensor assemblies 20 count 32,000 harvested plants/ac, not including any emerged late plants. The system 10 via the visualization system 18 and associated processing components, described above, may then divide 250 by 32,000 to achieve a yield per plant of 0.0078 bushels. In certain implementations the system 10, may multiply that calculated yield per plant by 1000 to achieve of a yield per 1000 plants. In some implementations, the system 10 can divide the yield (250 bu/ac) by number of harvested plants divided by 1000, to equal about 7.8 bushels per 1000 plants.

In certain implementations, yield per plant is visualized as ear weight. To calculate ear weight:

$$\frac{YPA \times 56}{\text{Harvested Plant Quantity}}$$

Where YPA is derived from the yield monitor 44 and the harvested plant quantity is derived from the stalk sensor assemblies 20. A value of 56 pounds per bushel is a standard value for corn. The YPA is a volumetric measurement that must be converted to weight when yield per plant is calculated and visualized using ear weight.

YPK and ear weight are expressed in different units (volume and weight respectively), the values can be used interchangeably when evaluating the proportional difference between various treatments.

YPK may be a useful metric where it is important to visualize the yield with respect to only the number of harvested plants. YPK is a function of kernel weight and kernel count per plant of the plants present at harvest. YPA is a function of kernel weight and kernel count per plant but is lowered by yield lost due to missing and emerged late plants. In other words, YPA reflects a yield penalty for missing plants and emerged late plants.

Because plants standing at harvest do not make up the yield lost from missing plants 3 or emerged late plants 2A or any compensation is negligible, YPK can be useful for comparing the yield response of agronomic and/or mechanical treatments. YPK can represent the true agronomic yield response better than YPA in cases where a mechanical issue proportionally caused more missing plants 3 and/or emerged late plants 2A in a particular treatment.

Figure 20:
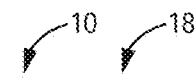
FIG. 20 shows exemplary harvest data for various hybrids.

FIG. 20 shows treatment comparison, specifically a corn hybrid comparison. Hybrid P 0987AMX yielded 13 bushels less than two DK hybrids on a YPA basis. However, Hybrid P 0987AMX yielded about the same on a YPK basis. The YPA difference can be attributed to the increased number of missing plants for the P 0987AMX hybrid, 9.2% of the P 0987 plants were missing at harvest versus about 2% for the DK hybrids. YPK of the harvested P 0987 plants is 7.7, similar to the YPK of the DK hybrids of 7.6. It is agronomically reasonable to assume that missing plants could yield about 7.7 bu/1000 plants had they been there at harvest. If the missing plant rate of the P 0987AMX hybrid was similar to that of the DK hybrids, the YPA of P 0987 would be equal to or greater than the YPA of the two DK hybrids.

In reference to the above example, this data would let a farmer or other practitioner know that missing plants 3 and/or late emerging plants 2A are likely an important factor in the lower yield of the P 0987AMX hybrid. As discussed in more detail above, mechanical problems with the planter may be the reason for a high number of missing plants 3 or emerged late plants 2A. These missing plants 3 or emerged late plants 2A cause a lower YPA of an otherwise high yielding hybrid. This information allows a farmer or other practitioner to make fully informed decisions. For example, knowing all three hybrids had the same YPK and noting a mechanical problem caused the P 0987 missing plants, means the farmer may now consider P 0987 to be equal in yield to the two DK hybrids if planted properly.

Figure 21:
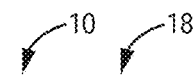
FIG. 21 shows exemplary harvest data for various hybrids.

FIG. 21 shows various yield data for certain exemplary corn hybrids. In this example, emerged late plants 2A are excluded from harvested plants 2. The YPA of both hybrids was the same at 173 bu/ac. Yet the YPK of the 42-98 hybrid was 20% higher than the 61-49 hybrid (7.1 compared to 5.9 bu/1000 plants). This information allows for assessing if a certain hybrid is higher yielding, has a chronic missing plant problem, or has independent mechanical causes for lower yields. This data can assist a farmer or other practitioner in assessing crop yield and determining the best hybrids for subsequent plantings, as would be understood.

In various implementations of the system 10, the stalk sensor assembly 20 and the visualization system 18 can calculate and visualize YPK and/or ear weight comparisons from different agronomic and/or mechanical treatments. The YPK or ear weight can be visualized as an average of across all row or in other ways as would be recognized. In various implementations, the data can appear in various forms including a bar graph, numerically, and/or a color map with a legend indicating YPK and/or ear weight magnitude via GUI in the in-cab display 15. Alternate implementations utilize further data metrics and display techniques, as would be readily appreciated by those of skill in the art.

It is understood that YPK and/or ear weight visualization via the visualization system 18 can be used for row-by-row yield monitoring. It is further understood that in various implementations, the stalk sensor assemblies 20 do not directly measure the amount of grain per stalk, but that the amount of grain per stalk can be estimated due to the strong correlation between the number of harvested stalks to the number of productive ears, as discussed above. That is, using the visualization system 18, processing components, and previous data sets, it is possible to estimate or otherwise predict the grain per stalk given certain known or gathered parameters, such as an instantaneous or near real-time yield, number of stalks harvested per unit area and/or per row, YPK, and others as would be appreciated, each of which can be entered by the user, gathered via the system 10, determined by the sensor assemblies 20 or pulled from stored data on a database 47, server 45, in the cloud 46 or elsewhere, as would be readily appreciated by those of skill in the art.

In various implementations, the system 10, and associated processing components, may determine the row-by-row YPA according to the ratio of harvested productive plants, excluding missing plants and late emerged plants, in each row to the average counted harvested productive plants across all corn head rows. The system 10 can include an instantaneous, or near real-time yield monitor 44, as described above. Additionally, the system 10, in conjunction with the sensor assemblies 20, can determine the number of stalks 2 harvested per row. In one specific example—wherein it is assumed that all productive plants harvested have the same YPK—the real time yield is 250 bu/ac and the row-by-row count of stalks 2 harvested is 30,000 plts/ac for row 1, 25,000 plts/ac for row 2, 30,000 plts/ac for row 3, and 30,000 plts/ac for row 4. The system 10 may divide the number of harvested plants per row by the average number of harvested plants across all rows to determine a per row plant ratio.

Continuing with the above example, the per row plant ratio is 1.043 for row 1, 0.870 for row 2, etc. The plant ratio may then be multiplied by real-time yield to determine the YPA per row. In the example, the YPA for row 1 is 260, 218 for row 2, etc.

An exemplary equation for determining a YPA per row is:

$$\frac{Count_n}{Avg \text{ harvested plants across all corn head rows}} = \frac{Yield_n}{Avg \text{ yield aross all corn head rows}}$$

where n is the individual row number.

In another implementation, the row-by-row yield can be calculated by multiplying the YPK by the number of harvested plants per acre by row (expressed in thousands). The YPK may be determined by dividing the yield (250 bu/ac) by the average number of harvested plants per acre (28.75). It would also be appreciated by those of skill in the art that other equations and methods, such as a direct proportional distribution method, may be used to determine row-by-row YPA values.

In these and other implementations, the row-by-row YPA can be visualized via the visualization system 18. The various data, including the row-by row YPA, can be visualized in different forms, for example, bar graph, numerically, or a color map with a legend indicating YPA magnitude. In some implementations, the data can be visualized comparatively by agronomic or mechanical treatment.

VIII. Economic Loss

Various implementations of the system 10 having a visualization system 18 are constructed and arranged to calculate and display economic loss.

It will be appreciated that YPA quantifies the amount of sellable grain in all field areas, but it does not quantify the yield "that could have been." Said another way YPA does not quantify the potential yield lost due to missing plants 3 and emerged late plants 2A.

The missing plants 3 and/or emerged late plants 2A can be expressed as an estimated economic or monetary loss to help practitioners comprehend the extent of financial loss better than plants per area and percent quantifications.

In some implementations, the system 10 can perform various calculations, including determining missing plants 3 and emerged late plants 2A in plants per area units averaged across all rows of the corn head 13. FIGS. 20 and 21 show missing plants 3 and emerged late plants 2A as a percent quantification. The system can calculate the number of missing plants 3 and emerged late plants 2A by multiplying the number of planted plants/ac by the percentage of missing plants 3 and the percentage of emerged late plants 2A. To calculate only one parameter (missing plants 3 or late emerged plants 2A) the system 10 omits the other parameter percentage from the calculation.

Using hybrid 42-98 in FIG. 21 an example the calculation may be:

$$\frac{34{,}300 \text{ plant}/ac \times (25\% + 4\%)}{100}\ 9{,}947 \text{ plants}/ac$$

As desired, if only the number of missing plants 3 was desired the 4% can be removed from the calculation, such that the number of missing plants 3 is 8,575 plants/ac.

In various implementations the system 10 can determine potential lost yield. Potential lost yield can be calculated by multiplying the number of missing and emerged late plants divided by 1000, as calculated above, by the YPK. This value represents the estimated yield loss from missing plants 3 and emerged late plants 2A assuming a 100% yield loss for the missing plants 3 and late emerged plants 2A.

Continuing with the above specific example, the potential yield loss is:

9.947 (plants/1000)/ac×7.1=71 bu/ac

In some implementations, the system 10 can determine economic loss. For this calculation a selling price must be assumed or determined. The economic loss may be calculated by multiplying the potential lost yield, as calculated above by the selling price/bushel. The selling price can be user entered in the system 10 or otherwise gathered from an external or internal source.

Continuing with the above specific example, the economic loss is:

71 bu/ac×$3.50/bu=$249/ac loss

In this example the price per bushel is assumed to be $3.50 per bushel.

The various data can be visualized in different forms, for example, bar graph, numerically, or a color map with a legend indicating economic loss magnitude. In some implementations the data can be visualized comparatively by agronomic or mechanical treatment. For example, a bar graph, as shown in FIG. 18A or FIG. 18B, can be modified by substituting on the Y axis various calculated or measured parameters.

IX. Area Counting

In some implementations, the system 10 is constructed and arranged for harvester area counting that is row independent, also referred to as row-by-row. In these and other implementations, the stalk sensor assemblies 20 allow for row-by-row area counting. In these and other implementations, each stalk sensor assembly 20 turns area counting on when it detects a stalk 2 feeding into the row unit 12. Each stalk sensor assembly 20 turns area counting off when stalks 2 stop feeding into the row unit 12. The area count contribution of each row is a function of harvester ground speed multiplied by row width, and can be calculated and displayed via the visualization system 18 as would be appreciated.

As an exemplary implementation, FIG. 7 depicts an eight row, 30-inch row width corn harvester 11 finishing a pass. In this example, stalks 2 are no longer feeding into corn head 13 rows 1-3. As such the stalk sensor assemblies 20 of rows 1-3 are not counting area, while the stalk sensor assemblies 20 of rows 4-8 are counting area as signaled by the presence of stalks 2 feeding into each row 12.

At various times one or more rows 12 may have an extended length of consecutive missing plants 3—for example 3+ feet with no plant. In this situation, to maintain YPA accuracy, the system 10 keeps area counting on because the missing plants 3 represent an unintended economic loss.

In some implementations, to prevent false area count off triggers, the system 10 can shut off area counting in a cascading fashion from the outside of the corn head 13 in. Said another way, an inside row will not shutoff until an adjacent more exterior adjacent row shuts off. For example, referring to FIG. 7, row 3 will not shutoff until row 2 shuts off, and row 2 will not shutoff until row 1 shuts off. This outside to inside daisy chain or cascading type method prevents false area count off triggers on inside rows.

In certain implementations, the two furthest outside row units 12 will not shut off until they experience more than a threshold amount of consecutive distance, such as feet or meters, of missing plants 3. The threshold may be a user entered setting or a hard-coded setting, such as about 3 feet. Other distances ranging from about one inch to about 10 feet or more are of course possible in alternate implementations.

X. Row Alarms

Certain implementations of the agricultural system 10 utilize row alarms. Referring now to FIG. 22, corn heads 13 have two stalk rolls 58 per row 12 that pull and crumple the stalk down through the corn head 13 to the ground. A set of stripper plates 30A, 30B strip the ear off the stalk 2 as the stalk 2 is pulled down through a gap between the plates. Gathering chains 52A, 52B (also referred to as gathering fingers) carry the stripped ears to a cross auger that conveys to the harvester feeder hose.

Stalks, rocks, grass, weeds, soil, and the like may from time to time jam in the stalk rolls 58 or gathering chains 52A, 52B imposing a high torque on the stalk rolls 58 and gathering chains 52A, 52B. To prevent mechanical breakage, corn head row units 12 in some implementations include a mechanical clutch that will slip at high torques. In these implementations, when the clutch starts to slip, the row unit 12 RPM slows and the row unit 12 may move in a jerky motion. The row unit 12 may stop turning altogether if it cannot clear the jam through the stalk rolls 58 and gathering chains 52A, 52B.

Figure 23:
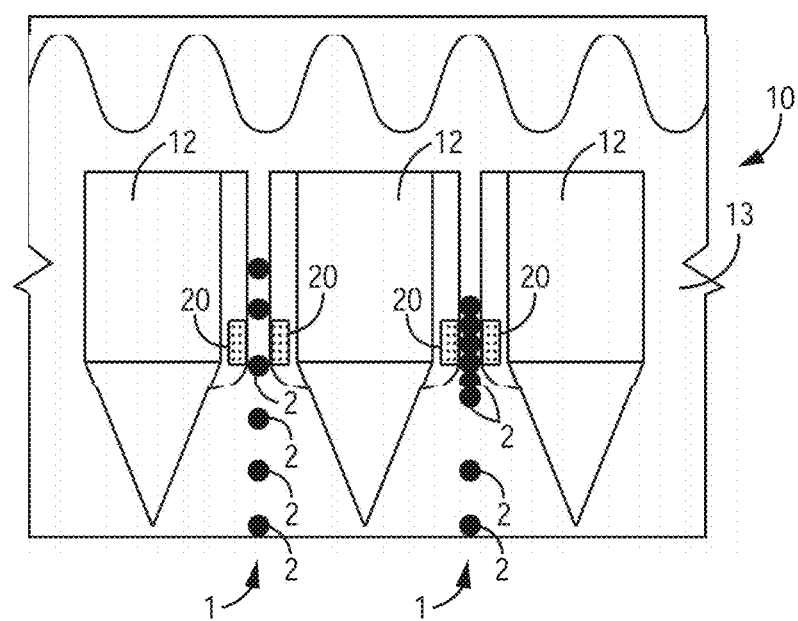
FIG. 23 is a top view of a corn head and row units, according to one implementation.
Figure 24:
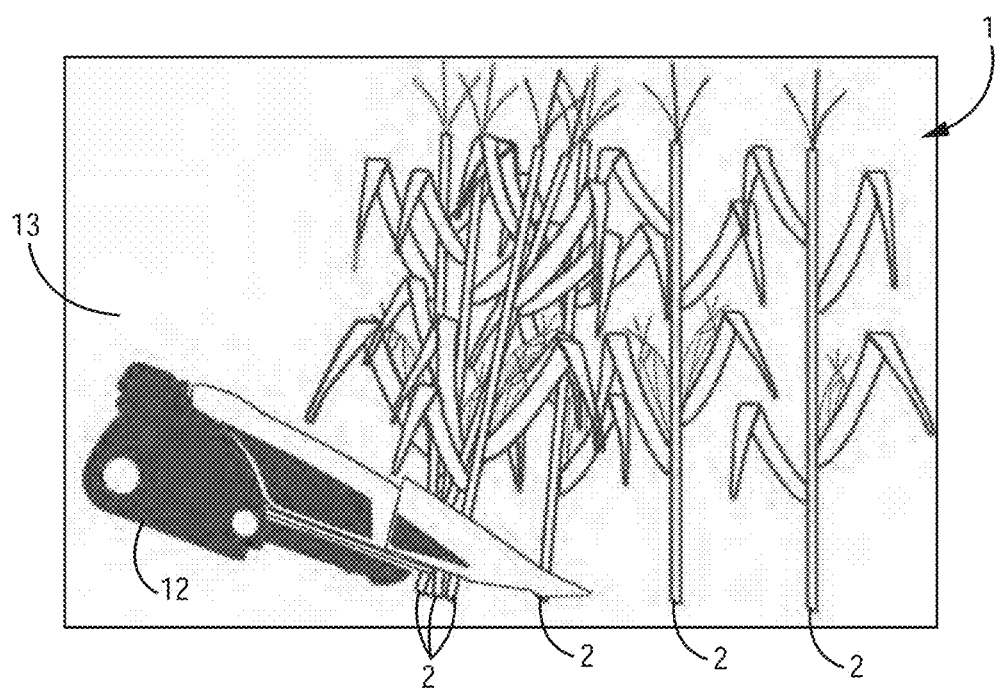
FIG. 24 is a side view of a row unit with plant stalk jam, according to one implementation.

Turning to FIGS. 23 and 24, if the row unit 12 stops turning, stalks 2 can jam up next to each other in front of the row unit 12. These plugged rows may result in a 100% yield loss until they are unplugged because the row unit 12 stops gathering ears altogether. As a further complication, in certain situations it is understood that after the plugged row jams full of stalks 2, the row unit 12 pushes over and breaks off stalks leaving all the ears on the ground.

In use, according to certain implementations, the agricultural system 10 may detect a plugged row unit 12 by sensing one or more stalks 2 jammed together via the sensor assembly 20 with proximity sensor 32. During corn head 13 operation, the sensor assembly 20 according to these implementations is configured to detect gaps or spaces between individual stalks 2 via the proximity sensor 32 as the stalks 2 enter the row unit 12 and pass through the sensor assembly 20. For example, the proximity sensor 32 can measure the stalk gap distance by measuring the time or distance between when the proximity sensor 32 is on—when the wheels 22 return to their original position—to when the proximity sensor 32 is off indicating the next stalk has entered the sensor assembly 20. The stalk gap distance can be set to a defined threshold, such that when the stalk gap distance violates the defined threshold a jam has occurred. Accordingly, the system 10 according to these implementations is configured to issue a row plugged alarm, such as on the in-cab display 15, when no stalk gaps are detected for a defined travel distance or time, or the stalk gap distance otherwise violates the defined threshold. Other parameters can be used in alternate implementations, as would be understood.

There are further possible complications; often corn heads 13 have too many rows for an operator to effectively visually watch for jams at typical harvest speeds. Additionally, outside corn head 13 rows may be difficult to see due to their distance and orientation away from the cab of the harvester 11. The visual difficultly may increase due to nighttime harvests or dust.

Figure 25:
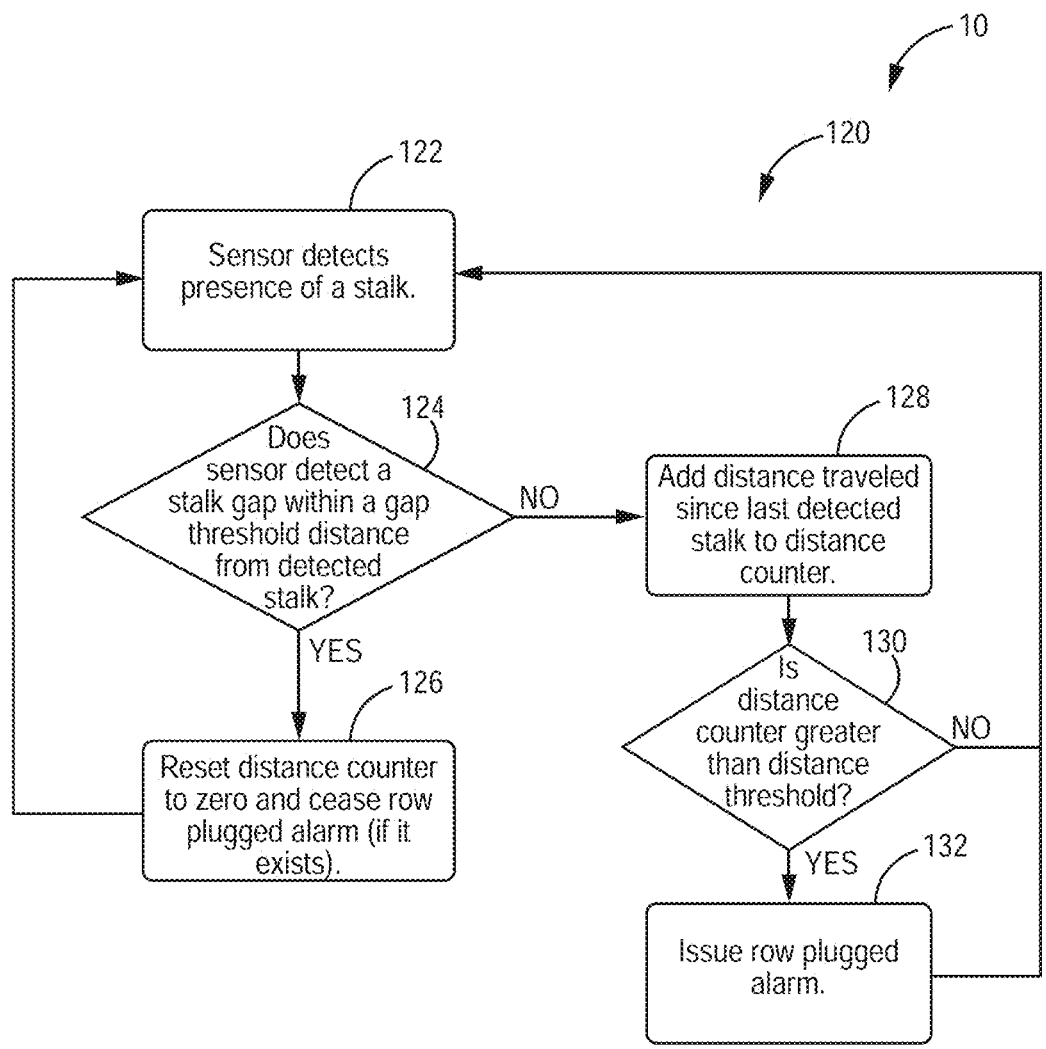
FIG. 25 is a flow chart depicting an exemplary algorithm for row alarms, according to one implementation.

FIG. 25 is flowchart depicting an exemplary algorithm for a row plug alarm 120 within the system 10 based on distance traveled since the last stalk gap was detected. In various implementations, the threshold distance may be entered by a user or may be a predefined setting within the system 10. In various implementations, the distance threshold may be about 3 feet and the gap threshold distance may be about 0.5 feet. It is readily appreciated that other threshold distances and gap threshold distances may be employed in alternate implementations.

In various implementations, the row plug alarm 120 will be issued after a series of steps are executed via the system 10 and associated hardware components, discussed above. During harvest the sensor assemblies 20 detect the presence of stalks 2 (box 122), as discussed above. The row plug alarm 120 then asks if there is a stalk gap within the gap threshold distance (box 124). If there is a stalk gap within the threshold distance, no plug is detected, no alarm is issued and the sensor assembly 20 begins sensing the next stalk 2 and stalk gap.

If the sensor assembly 20 does not detect a stalk gap or the stalk gap is less than the threshold distance, the system 10 may then add the distance traveled since the last detected stalk to the distance counter (box 128). Next, the system will ask if the distance counter is greater than the distance threshold (box 130). If the distance counter is less than the distance threshold, no plug is detected, no alarm is issued and the sensor assembly 20 begins sensing the next stalk 2 and stalk gap. If the distance counter is greater than the distance threshold then a plug is detected and the row plug alarm is issued (box 132).

Figure 26:
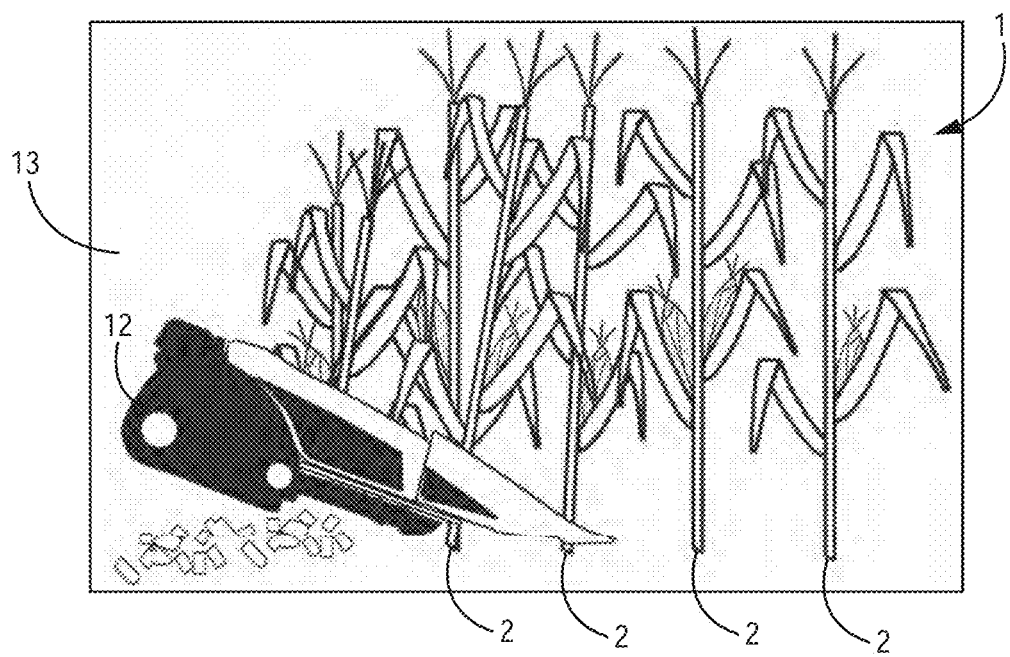
FIG. 26 is a side view of a row unit with a slow turning rate, according to one implementation.
Figure 27:
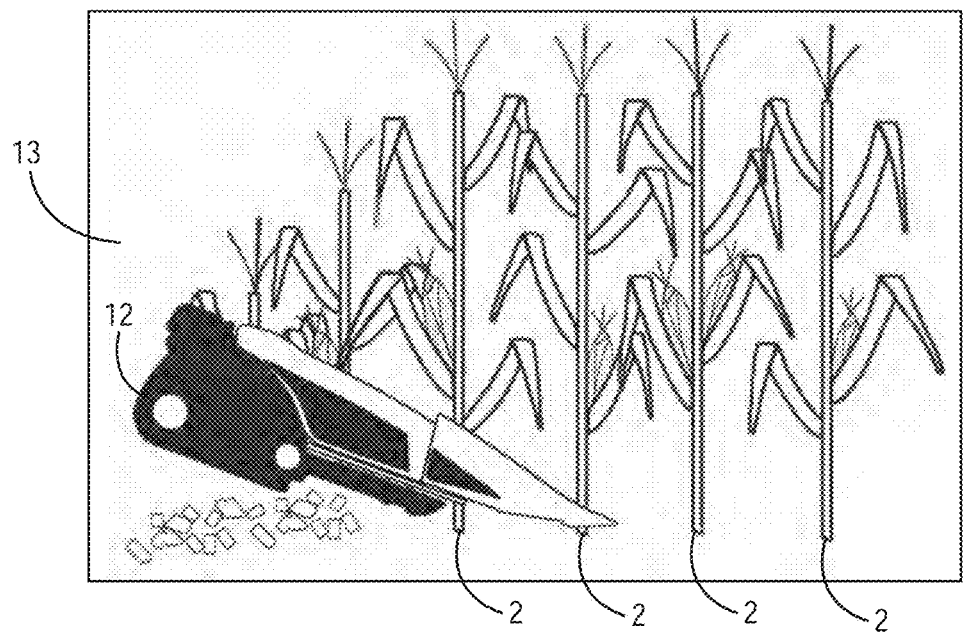
FIG. 27 is a side view of a row unit with correct turning rate, according to one implementation.

As shown in FIG. 26, row units 12 may turn slow and cause stalks 2 to bunch together as they feed into the row unit 12. This slow turning and bunching may cause header grain loss through uneven feeding or plugging. Row units 12 turning too fast can cause a high ear impact on stripper plates (shown in FIG. 22 at 30A, 30B) that shell grain off the ear bottom. Corn header row units 12 need to be turning fast enough that stalks 2 maintain their plant spacing as they feed into the head 13 and but not so fast as to cause high impact forces on the stripper plates 30A, 30B, as shown in FIG. 27.

Farmers or other operators may set the corn head 13 speed to correctly feed stalks 2 for a certain ground speed. As conditions change and operators change harvester ground speed, the corn header 13 RPM needs to be adjusted as well, but often is not. In various implementations, the stalk sensor assemblies 20 can detect if the corn head 13 speed is either too fast or too slow for the current ground speed by looking for gaps between stalks 2 that are different than gaps that correspond to the target seeding rate. The system 10 can issue an alarm to alert an operator that the row unit 12 is not operating at the correct or optimal speed. The alarm may continue until the sensor assembly 20 detects gaps that correspond to the target seeding rate. In some implementations, the alarm may notify the harvester operator to decrease travel speed or increase the header RPM or a combination of both. The operator knows the travel speed and/or header RPM is corrected when the alarm ceases.

In alternate implementations, the system 10 may automatically control header speed by the rate of stalks 2 passing by the sensor assembly 20. In one specific example, the optimum corn head speed for 10 stalks per second entering the row unit 12 may be 450 RPM and 15 stalks per second might be 525 RPM. The system 10 may automatically adjust the corn head speed to 525 RPM when the rate jumps from 10 to 15 stalks per second. In various implementations, the automatic speed control can be independent, row-by-row, or for all rows together.

XI. Planter Rows

The system 10 may have access to "as-planted" spatial information recorded from the planting operation. Using the harvester 11 GPS location, the system 10 determines the as-planted pass the harvester 11 is harvesting. Because planter rows 12 commonly exceed corn head 13 rows by a multiple of two or three, the system 10 must find the right set of contiguous planter rows within the planter pass width that aligns with the corn head 13 row units 12. Various planter recording systems spatially record each row and its planter row number. In these and other implementations, the system 10 uses the harvester 11 GPS location to associate the correct set of planter row numbers to the corn head 13.

Figure 28:
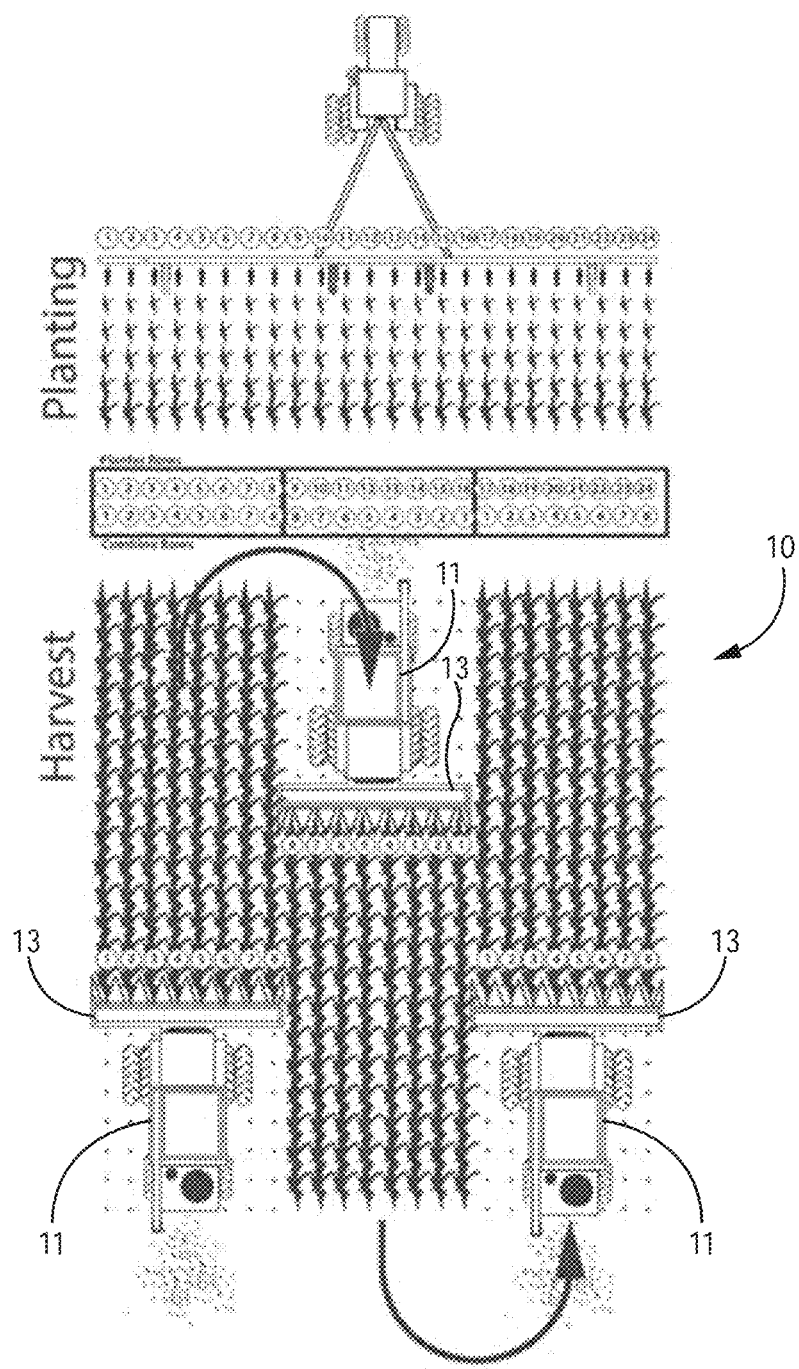
FIG. 28 is a top view of a planter and a harvester comparing row numbers, according to one implementation.

The corn head 13 to planter row association can be automatically reset for every harvested pass as triggered by when the harvester 11 starts harvesting a new pass as shown in FIG. 28.

In implementations where the as planted information does not contain planter row numbers, the system 10 may determine the planter row number to corn head 13 row number association by comparing planting direction to the harvester 11 direction and taking into account planter width and where the harvester 11 lines up within that planter width.

The system 10, in some implementations, may record and display the field average harvested plants 2, missing plants 3 and emerged late plants 2A per area by each planter row number. The system 10 may update field averages as new stalks 2 are harvested and counted.

Figure 29:
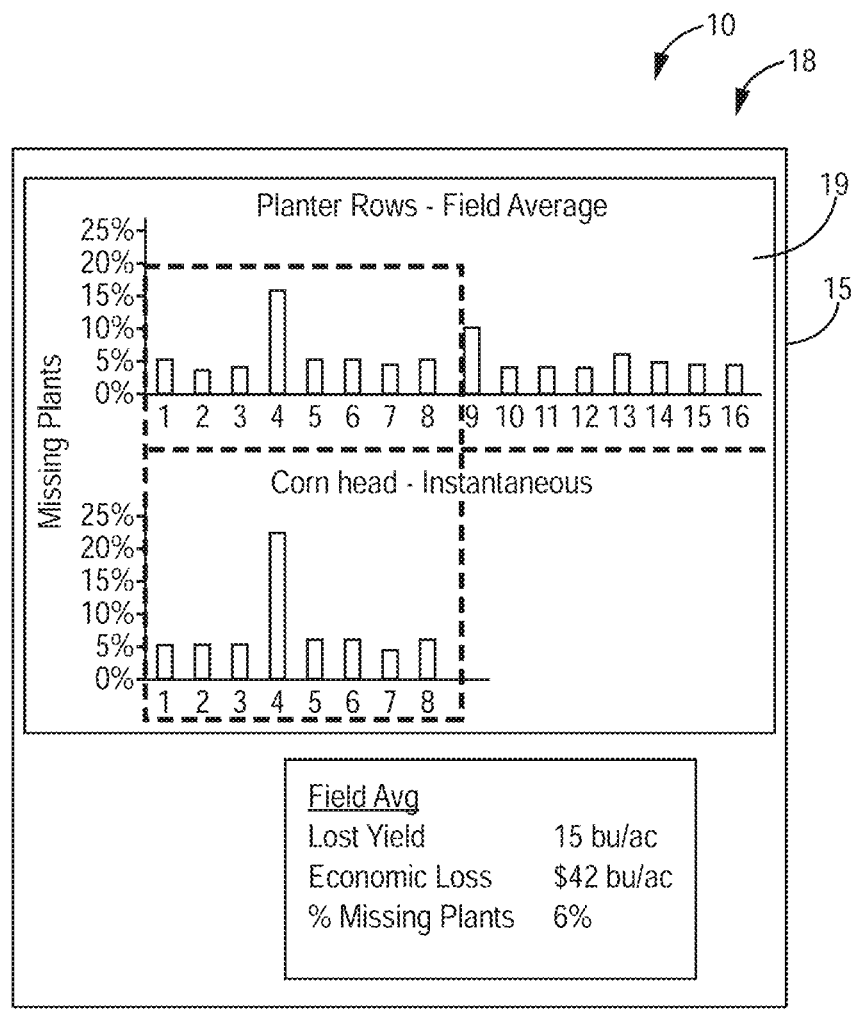
FIG. 29 is an exemplary user interface, according to one implementation.

FIG. 29 depicts an exemplary in-cab display 15 and user interface 19. The real-time or near real-time feedback of data from the sensor assemblies 20 can indicate mechanical issues with the planter. For example, in FIG. 29, the fourth planter row unit has a field average of 15% missing plants, which is substantially higher than other row units, which indicates something may be wrong with the fourth row unit and/or fourth row.

In some implementations, the system 10 has a reset or restart function for the planter row average. The reset or restart function can be a manual or automatic function. The system 10 may reset or restart the data collected when harvesting a new condition or field section. In one example, an automatic reset function may be triggered when the harvester 11 switches to a new field, field sub-region or hybrid.

In another example, the system 10 may trigger an automatic reset or restart when the harvester 11 enters a field area that has a different pre-recorded planter, sprayer, fertilizer or tillage parameter, such as seed depth, closing wheel adjustment, row cleaner adjustment, row unit gauge wheel down force, or other parameters as would be recognized be those of skill in the art.

In various implementations, the system 10 names and records each instance as a numerical summary of the average performance of each planter row.

Although the disclosure has been described with reference to various embodiments, persons skilled in the art will recognize that changes may be made in form and detail without departing from the spirit and scope of the disclosed apparatus, systems and methods.

What is claimed is:

1. An agricultural data visualization system for use on a corn head comprising one or more row units, the data visualization system comprising:
    (a) one or more sensors disposed on the one or more row units, each of the one or more sensors configured to sense stalks passing through the corn head;
    (b) a GPS receiver in association with the corn head configured to detect a location of the corn head during harvest operations;
    (c) a display in communication with the one or more sensors and the GPS receiver; and
    (d) a storage system comprising as-planted spatial information in communication with the display,
    wherein the display is configured to correlate the as-planted spatial information with the location of the corn head during harvest operations, wherein each of the one or more row units is correlated to a planter row unit on the basis of the as-planted spatial information, and wherein correlation of the one or more row units and the planter row unit is reset for every harvester pass.

2. The system of claim 1, wherein the GPS receiver is at a known offset from each of the one or more sensors, and wherein the known offset is used to map locations of one or more sensors during harvest operations.

3. The system of claim 1, wherein the one or more sensors are configured to measure at least one of a number of harvested plants, a number of missing plants, seed spacing, and stalk size.

4. The system of claim 1, wherein the display comprises a user interface for display of data from the one or more sensors on-the-go.

5. The system of claim 4, wherein data from the one or more sensors is displayed on a row-by-row basis.

6. A stalk detection system for an agricultural harvester comprising one or more row units comprising:
    (a) at least one stalk sensor assembly disposed on each of the one or more row units, where the each of the at least one stalk assemblies are configured to detect plant stalks;
    (b) a processor; and
    (c) a GPS receiver in electronic communication with the agricultural harvester configured to determine locations of the agricultural harvester during harvest operations,
    wherein the processor is configured to compare detected plant stalks to a number of expected stalks based on planting data and wherein the processor is configured to use the locations of the agricultural harvester during harvest operations to match harvested rows with planter row numbers.

7. The system of claim 6, wherein the processor is configured record and display one or more of a number of plants planted row-by-row, a number of plants harvested row-by-row, a percentage of missing plants per row, a number of missing plants per row, and a percentage of emerged late plants per row.

8. The system of claim 6, wherein the at least one stalk sensor assembly is configured to detect stalk size.

9. The system of claim 8, wherein the system is configured to detect late emerged plants based on detected stalk size.

* * * * *